(12) United States Patent
Kao et al.

(10) Patent No.: US 12,538,492 B2
(45) Date of Patent: Jan. 27, 2026

(54) IC MEMORY DEVICE IMPLEMENTING AN IMPLY FUNCTION

(71) Applicant: Taiwan Semiconductor Manufacturing Company, Ltd., Hsinchu (TW)

(72) Inventors: Yun-Feng Kao, New Taipei (TW); Katherine H. Chiang, New Taipei (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 375 days.

(21) Appl. No.: 18/346,981

(22) Filed: Jul. 5, 2023

(65) Prior Publication Data

US 2025/0017016 A1    Jan. 9, 2025

(51) Int. Cl.
| | |
|---|---|
| *H10B 43/35* | (2023.01) |
| *G11C 16/14* | (2006.01) |
| *H01L 23/522* | (2006.01) |
| *H03K 19/21* | (2006.01) |

(52) U.S. Cl.
CPC ............. *H10B 43/35* (2023.02); *G11C 16/14* (2013.01); *H01L 23/5226* (2013.01); *H03K 19/21* (2013.01)

(58) Field of Classification Search
CPC ....... H10B 43/35; G11C 16/14; G11C 11/223; G11C 11/2273; G11C 11/2275; G11C 16/0441; G11C 16/0466; G11C 16/10; H01L 23/5226; H03K 19/21
See application file for complete search history.

(56) References Cited

U.S. PATENT DOCUMENTS

| | | | |
|---|---|---|---|
| 2019/0079731 A1* | 3/2019 | Swartzlander | .......... G06F 7/501 |
| 2020/0287046 A1 | 9/2020 | Frougier et al. | |
| 2022/0254382 A1 | 8/2022 | Sakakibara et al. | |
| 2023/0023327 A1 | 1/2023 | Nagashima et al. | |
| 2023/0064874 A1 | 3/2023 | Izawa | |
| 2024/0282360 A1* | 8/2024 | Wang | .................. G11C 11/4087 |
| 2024/0356555 A1* | 10/2024 | Timmerwilke | ........ H03K 19/21 |

* cited by examiner

*Primary Examiner* — Donald HB Braswell
(74) *Attorney, Agent, or Firm* — Eschweiler & Potashnik, LLC

(57) ABSTRACT

Some embodiments relate to an integrated circuit including first and second charge-trapping devices and a control circuit. The first charge-trapping device includes a first charge-trapping structure arranged over a substrate between a first gate structure and a first channel region. The second charge-trapping device is coupled in series with the first charge-trapping device and includes a second charge-trapping structure arranged over the substrate between a second gate structure and a second channel region. The control circuit is coupled to the first and second gate structures and is configured to store a first input of an IMPLY operation as a stored value of the first charge-trapping device, store a second input of the IMPLY operation as a stored value of the second charge-trapping device, and update the stored value of the second charge-trapping device based on the stored value of the first charge-trapping device to perform the IMPLY operation.

20 Claims, 22 Drawing Sheets

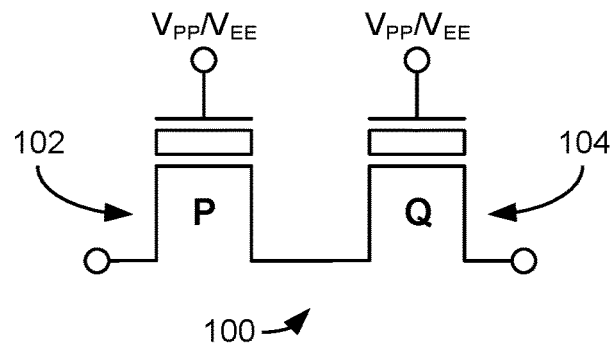
FIG. 2A
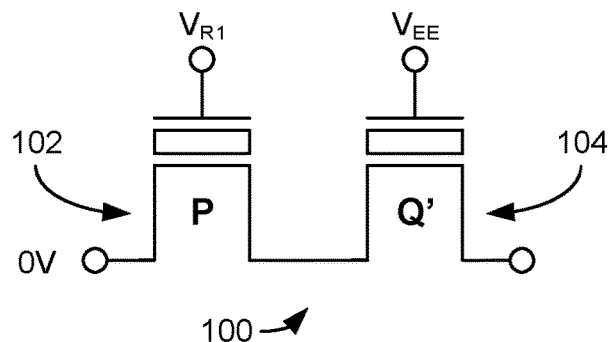
FIG. 2B
| P | Q | Q' = P IMP Q |
|---|---|---|
| 0 | 0 | 1 |
| 0 | 1 | 1 |
| 1 | 0 | 0 |
| 1 | 1 | 1 |
FIG. 2C
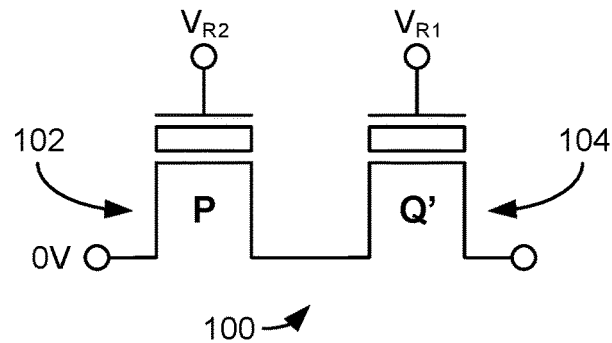
FIG. 2D

| Q | S | S' = Q IMP 0 |
|---|---|---|
| 0 | 0 | 1 |
| 1 | 0 | 0 |

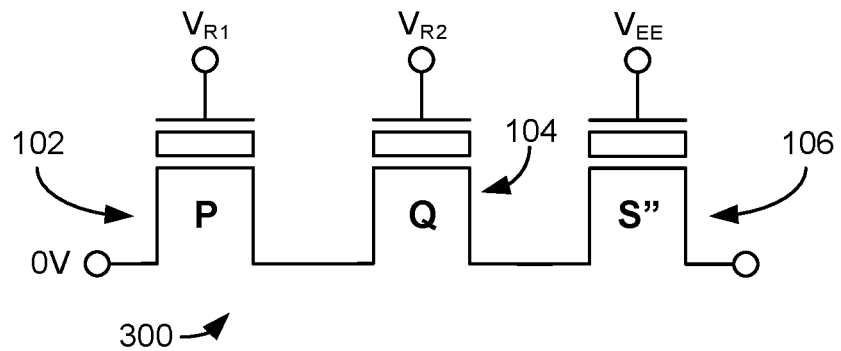
FIG. 3E
$$S" = P\ IMP\ S'$$
$$= P\ IMP\ (Q\ IMP\ 0)$$
$$= P\ NAND\ Q$$
| P | S' | |
|---|----|---|
| 0 | 1  | 1 |
| 1 | 1  | 1 |
| 0 | 0  | 1 |
| 1 | 0  | 0 |
FIG. 3F
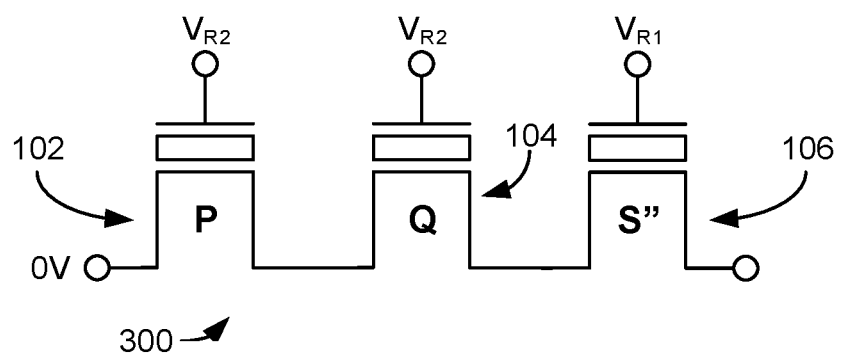
FIG. 3G

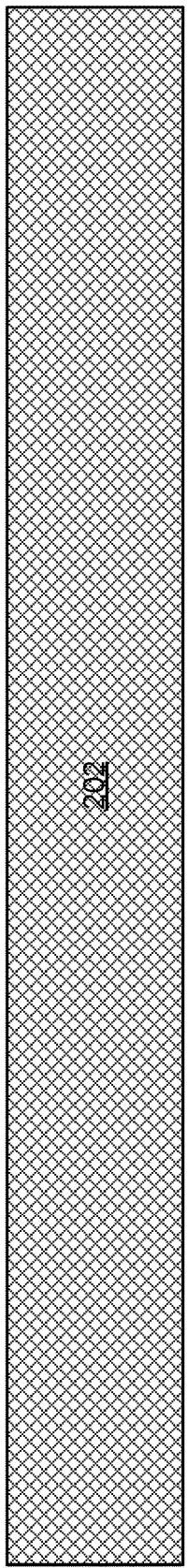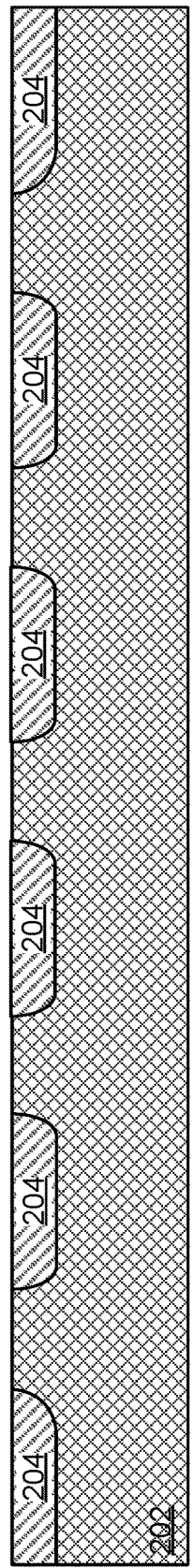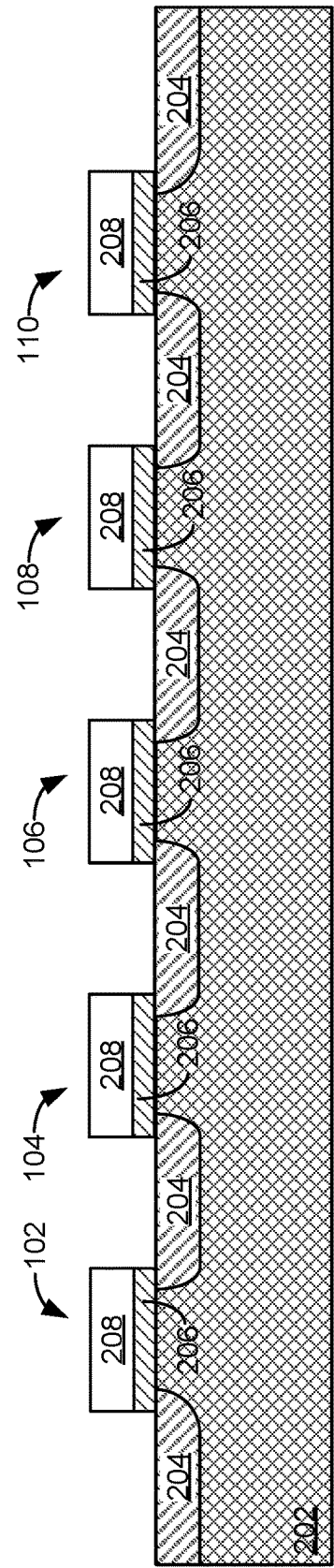

IC MEMORY DEVICE IMPLEMENTING AN IMPLY FUNCTION

BACKGROUND

Many modern day electronic devices contain electronic memory. Electronic memory may be volatile memory or non-volatile memory. Non-volatile memory is able to retain its stored data in the absence of power, whereas volatile memory loses its stored data when power is lost. Some efforts have been made to incorporate standard logic functionality within electronic memory (e.g., non-volatile memory) by way of in-memory computing to perform some preliminary data processing on stored data without explicitly reading the stored data from the memory into a central processing unit (CPU) beforehand.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2A through 2D illustrate a more detailed example of a series of operations using the IC memory device of FIG. 1A to implement an IMPLY function.

FIGS. 3A through 3G illustrate a series of operations using an IC memory device that includes three charge-trapping devices to implement a NAND function using a series of IMPLY functions.

FIGS. 7A through 7F illustrate some embodiments of a series of incremental manufacturing steps as a series of cross-sectional views of the IC memory device of FIG. 6 resulting from FEOL processing.

DETAILED DESCRIPTION

Figure 1A:
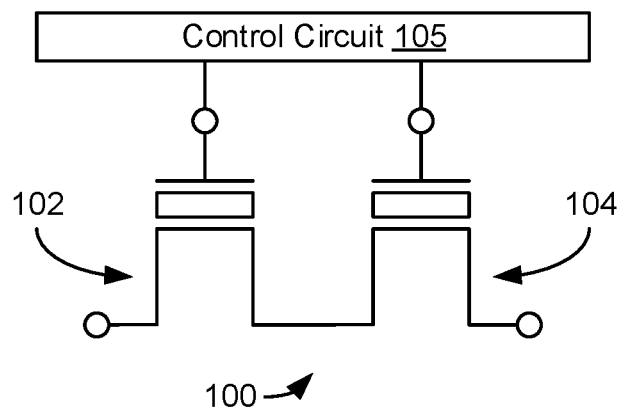
FIG. 1A illustrates a schematic view of some embodiments of a portion of an integrated circuit (IC) memory device including two charge-trapping devices to implement an IMPLY function, according to the present disclosure.

The present disclosure provides many different embodiments, or examples, for implementing different features of this disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In conventional computing configurations, memory and logic devices (e.g., within a computer processing unit (CPU)) are disposed within different parts of an integrated circuit. During operation, data is transported between the memory and the logic devices over relatively long bus wires. A resistance of the relatively long bus wires leads to power loss and degrades CPU performance. It has been appreciated that in-memory computing configurations can mitigate the power loss associated with relatively long bus wires. In-memory computing configurations comprise memory cells coupled with logic gates (e.g., in a field-programmable gate array (FPGA)) to provide some level of logic functionality without the involvement of a CPU that reads the data from the memory device before performing the desired logic. However, in such cases, a significant amount of additional logic circuitry may be closely integrated with the memory cells to facilitate the in-memory computing thereby increasing a footprint of the in-memory computing configuration.

In some embodiments of the present disclosure, the memory cells themselves, implemented using charge-trapping devices, may also at least partially serve as the logic circuitry by way of performing one or more IMPLY operations within the cells. Consequently, the integrated circuit footprint typically consumed by the charge-trapping devices and associated logic circuitry of an IC memory device implementing in-memory computing may be reduced (e.g., by maintaining the memory cells in an associated memory portion of the IC memory device and providing support for the logic functions in a separate control circuit of the device). Also, in some embodiments, the IC memory device may be fabricated during a front end of line (FEOL) process or a back end of line (BEOL) process, thus providing a level of flexibility in floor planning and other aspects of design of the IC memory device.

As employed herein, an IMPLY operation (sometimes implemented in digital logic as a logic gate) is a two-input binary operation that, for first input A and second input B, produces an output of "if A, then B." Accordingly, as described herein, if A is 0, then the output is 1, regardless of the value of B. If, instead, A is 1, the output is equal to B.

FIG. 1A illustrates a schematic view of some embodiments of a portion of an IC memory device 100 including two charge-trapping devices 102 and 104 configured to implement an IMPLY function, according to the present disclosure. Charge-trapping devices 102 and 104 are coupled in series (e.g., a drain of a first charge-trapping device 102 coupled to a source of a second charge-trapping device 104). In some embodiments, each of the charge-trapping devices 102 and 104 may be a ferroelectric field-effect transistor (FeFET). However, the charge-trapping devices 102 and 104 may be constructed using other charge-trapping transistor technologies, such as flash (e.g., NAND flash) technology, in other embodiments.

In some embodiments, a gate of each of the charge-trapping devices 102 and 104 may be coupled to a control circuit 105. The control circuit 105 is configured to drive the charge-trapping devices 102 and 104 to implement the IMPLY function. The ability of the control circuit 105 to implement the IMPLY function is based upon a drain current generated by the first-charge trapping device 102 in response to a voltage applied to the gate of the first charge-trapping device 102.

Figure 1B:
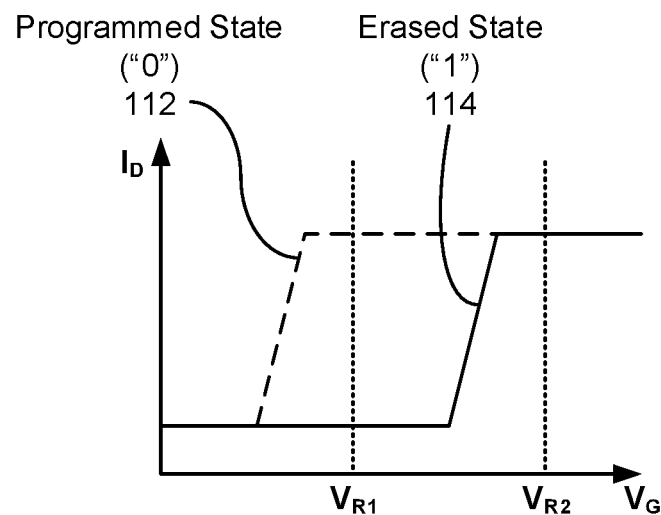
FIG. 1B illustrates a voltage graph describing the operation of the charge-trapping devices in some embodiments of the portion of the IC memory device of FIG. 1A, according to the present disclosure.

For example, FIG. 1B illustrates a voltage graph describing the operation of the charge-trapping devices 102 and 104 in some embodiments of the portion of the IC memory device of FIG. 1A, according to the present disclosure. In some embodiments, a charge-trapping device (e.g., the first charge-trapping device 102 or the second charge-trapping device 104) may be programmed by way of driving the gate of the charge-trapping device to one of two different levels: a programming voltage or state $V_{PP}$, which may cause the charge-trapping device to store a programmed state (e.g., a low or "0" state) 112, and an erasing voltage or state $V_{EE}$, which may cause the charge-trapping device to store an erased state (e.g., a high or "1" state) 114.

When the charge-trapping device stores a particular state, the charge-trapping device may be controlled to selectively output the stored state of the charge-trapping device. More specifically, as shown in FIG. 1B, when the gate voltage VG is held low (e.g., zero volts), the drain current $I_D$ of the charge-trapping device may be at a low (OFF) level regardless of the stored state of the charge-trapping device. Oppositely, when the gate voltage VG is held high (e.g., $V_{R2}$ volts), the drain current $I_D$ of the charge-trapping device may be at a high (ON) level or state regardless of the stored state of the charge-trapping device. However, when the gate voltage VG is held at an intermediate level (e.g., $V_{R1}$ volts, associated with a "read" state of the charge-trapping device), the drain current $I_D$ may indicate the stored state of the charge-trapping device (e.g., at a low or OFF level if in the programmed ("0") state 112 and at a high or ON level or state if in the erased ("1") state 114).

Because a drain current of a charge-trapping device may depend upon a state stored within the charge trapping device when the gate voltage is held at the intermediate level, a stored state within the first charge trapping device can be used to influence a stored state of the second charge trapping device in a manner that emulates an IMPLY gate. For example, referring again to FIG. 1A, when the first charge-trapping device 102 stores an erased state ("1"), the gate voltage being held at the intermediate level will not cause a drain current to flow, and thus a state stored in the second charge-trapping device 104 will remain a same state (e.g., a "0" or a "1"). However, when the first charge-trapping device 102 stores a programmed state ("0"), the gate voltage being held at the intermediate level may cause a drain current to flow, and thus a state stored in the second charge-trapping device 104 may be changed depending on the gate voltage of the second charge-trapping device 104.

Therefore, in some embodiments, the control circuit 105 may be configured to apply a first gate voltage to the gate of the first charge-trapping device 102 so as to store a first input of an IMPLY operation as a stored value of the first charge-trapping device 102. The control circuit 105 is further configured to apply a second gate voltage to the gate of the second charge-trapping device 104 so as to store a second input of the IMPLY operation as a stored value of the second charge-trapping device 104. The control circuit 105 is further configured to update the stored value of the second charge-trapping device 104 based on the stored value of the first charge-trapping device 102 to perform the IMPLY operation. By implementing the IMPLY function with memory cells in an associated memory portion of the IC memory device, a footprint consumed by the charge-trapping devices and associated logic circuitry of an IC memory device implementing in-memory computing may be reduced.

FIGS. 2A through 2D illustrate a more detailed example of a series of operations using the IC memory device of FIG. 1A to implement an IMPLY function. In FIG. 2A, the first charge-trapping device 102 may be programmed (e.g., by way of a programming voltage $V_{PP}$) or erased (e.g., by way of an erasing voltage $V_{EE}$) at its gate, resulting in a state "P" being stored therein. Also, the second charge-trapping device 104 may be programmed or erased at its gate, resulting in a state "Q" being stored therein.

Thereafter, at FIG. 2B, the gates of the charge-trapping devices 102 and 104 may be controlled to perform an IMPLY (sometimes denoted as "IMP") function having inputs P and Q, resulting in the result Q'=P IMP Q being stored in the second charge-trapping device 104. In some embodiments, the gate of the first charge-trapping device 102 may be set to $V_{R1}$ (e.g., an intermediate level associated with a read state of the first charge-trapping device 102), thus causing the drain current of the first charge-trapping device 102 to be set according to its stored state P. Also, the gate of the second charge-trapping device 104 may be set to $V_{EE}$ (e.g., an "erasing" state) in an attempt to place the stored state of the second charge-trapping device 104 to "erased" (or high, or 1) depending on the state P of the first charge-trapping device 102.

FIG. 2C provides a truth table describing the result Q' that is stored in the second charge-trapping device 104 as a result of the attempted erasure operation indicated in FIG. 2B. More specifically, if the state of the first charge-trapping device 102 (P) is low or 0, the first charge-trapping device 102 is in the ON state when the gate is set to $V_{R1}$ to place the first charge-trapping device 102 in its read state, thus enabling the erasure of the second charge-trapping device 104, resulting in its stored state Q' being erased (e.g., high or 1). If, instead, the state of the first charge-trapping device 102 (P) is high or 1, the first charge-trapping device 102 is OFF when the gate is set to $V_{R1}$, thus disabling the erasure of the second charge-trapping device 104, resulting in its stored state Q' remaining equal to its previous state of Q.

Thereafter, as shown in FIG. 2D, the new state Q' of the second charge-trapping device 104 may be output by way of its drain by setting the gate of the first charge-trapping device 102 to $V_{R2}$ (thus turning the first charge-trapping device 102 ON while retaining its state P), and setting the gate of the second charge-trapping device 104 to $V_{R1}$ to place the second charge-trapping device 104 in the read state, thereby outputting the state Q' of the second charge-trapping device 104 via its drain connection.

Consequently, by proper control of at least the gates of the two charge-trapping devices 102 and 104, which operate as memory cells, an IMPLY function using the stored states of the charge-trapping devices 102 and 104 may be produced.

Figure 2E:
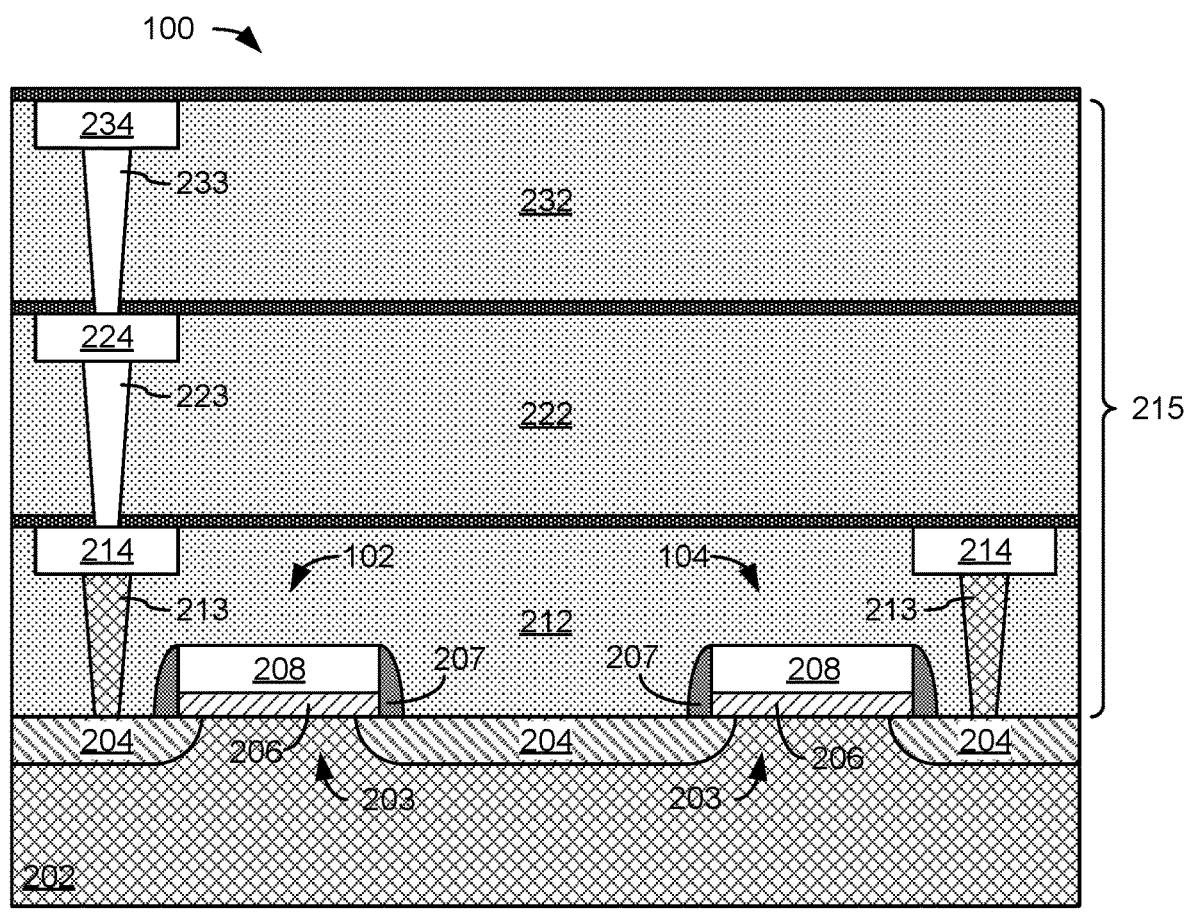
FIG. 2E illustrates a cross-sectional view of some embodiments of the portion of the IC memory device of FIG. 1A resulting from front end of line (FEOL) processing.

FIG. 2E illustrates a cross-sectional view of some embodiments of the portion of the IC memory device 100 of FIG. 1A resulting from front end of line (FEOL) processing. A substrate 202 may include multiple source-drain regions 204 (e.g., doped regions). As used herein, a source-drain region or structure may serve as either a source region or structure or a drain region or structure of a metal-oxide-semiconductor field-effect transistor (MOSFET), thin-film transistor (TFT), or the like. In some embodiments, each of a plurality of charge-trapping structures 206 may be formed above the substrate 202 to join a corresponding pair of adjacent source-drain regions 204, and a gate structure 208 may be formed over each charge-trapping structure 206. Each gate structure 208, charge-trapping structure 206, and associated pair of source-drain regions 204 may be positioned over an associated channel region 203 of the substrate 202, thus forming a corresponding one of the charge-trapping devices 102 and 104 coupled in series.

In addition, in some embodiments, each charge-trapping structure 206 and associated gate structure 208 may be surrounded by a spacer 207. Also, in some embodiments, at least the source-drain regions 204 at opposing ends of the serially-coupled charge-trapping devices 102 and 104 may be connected to other circuitry using a connection structure 215 that includes contacts 213, vias 223 and 233, and metal structures 214, 224, and 234 located in one or more dielectric layers 212, 222, and 232. In some embodiments, each of the gate structures 208 may be coupled by way of contacts, vias, and metal structures not shown in FIG. 2E (e.g., to control circuit 105 of FIG. 1A) to control the charge-trapping devices 102 and 104, as described herein.

Figure 2F:
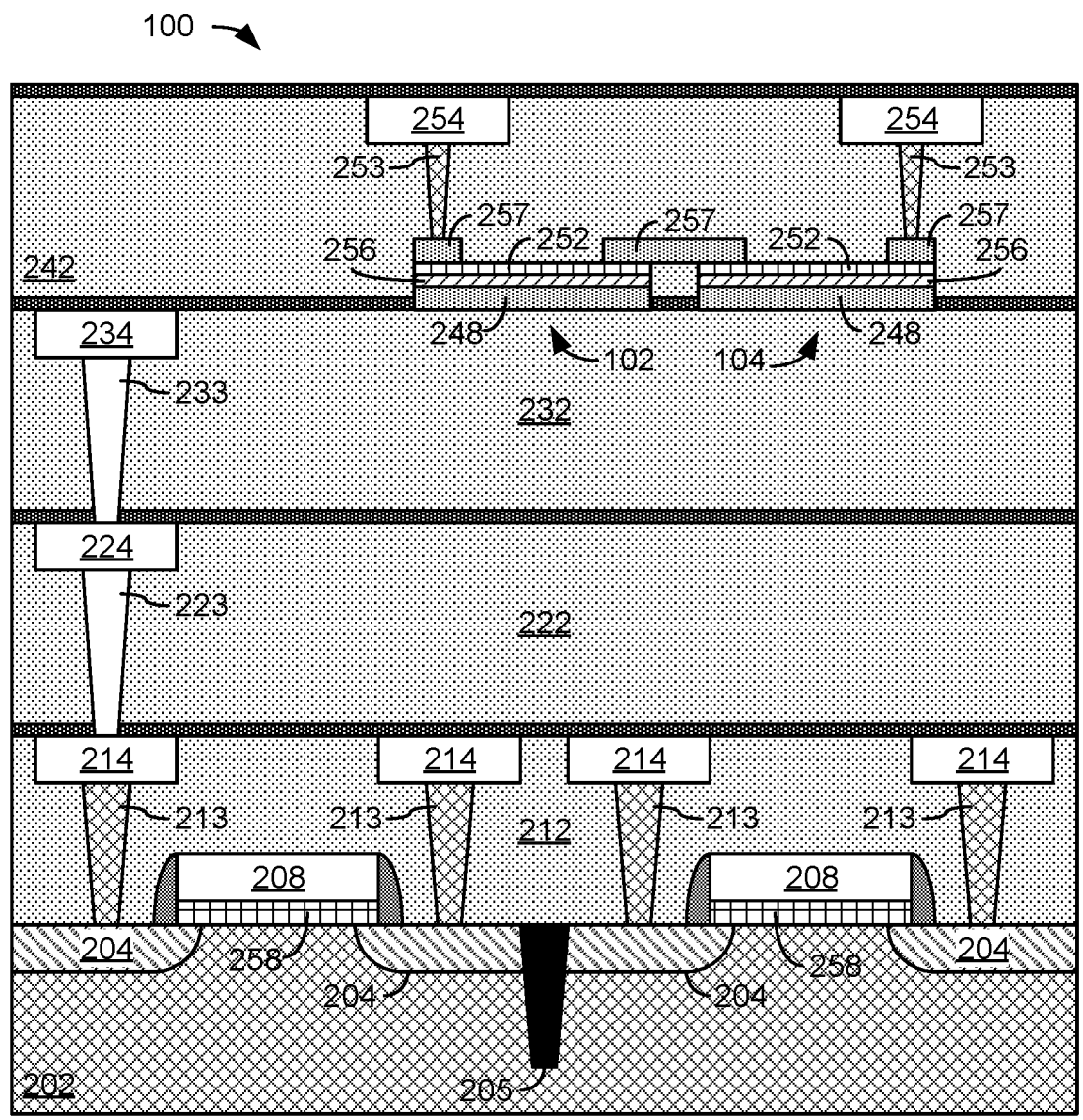
FIG. 2F illustrates a cross-sectional view of some embodiments of the portion of the IC memory device of FIG. 1A resulting from back end of line (BEOL) processing.

FIG. 2F illustrates a cross-sectional view of some embodiments of the portion of the IC memory device 100 of FIG. 1A resulting from back end of line (BEOL) processing. In some embodiments, the substrate 202 may include source-drain regions 204 that have been doped, implanted, or the like. However, in this case, a pair of the source-drain regions 204 may be bridged via a dielectric structure 258 (e.g., an oxide structure) and an associated gate structure 208 to create a MOSFET not directly associated with charge-trapping devices, as described herein. Further, in some embodiments, the MOSFETS may not be serially coupled, but may instead by isolated from each other (e.g., by way of a non-conductive plug 205 formed in the substrate 202 through one of the source-drain regions 204). Additionally, in some embodiments, the sources and drains of the MOSFETs may be coupled to other circuitry by way of contacts 213, vias 223 and 233, and associated metal structures 214, 224, and 234 located in one or more dielectric layers 212, 222, and 232. In some embodiments, each of the gate structures 208 may be coupled by way of contacts, vias, and metal structures not shown in FIG. 2F to control the MOSFETs.

In FIG. 2F, the charge-trapping devices 102 and 104 may be formed in an upper layer (e.g., dielectric layer 242 over dielectric layer 232) of the IC memory device 100 using thin-film transistor (TFT)-related processes instead of at the substrate 202. In some embodiments, a gate structure 248 is formed over a dielectric layer 232 (e.g., dielectric layer 232) for each of the charge-trapping devices 102 and 104. Also, a corresponding charge-trapping structure 256 may be formed over each gate structure 248. Additionally, a corresponding channel structure 252 (or channel region) may be formed over each charge-trapping structure 256. A plurality of source-drain structures 257 may also be formed over the channel structures 252 such that the channel structures 252 are bridged by one of the source-drain structures 257, and each end of the channel structures 252 at opposing ends of the serially-coupled charge-trapping devices 102 and 104 is covered with a corresponding one of the source-drain structures 257. Further, in some embodiments, at least the source-drain structures 257 at the opposing ends of the serially-coupled charge-trapping devices 102 and 104 may be coupled to other circuitry (e.g., control circuit 105 of FIG. 1A) by way of contacts 253 and metal structures 254. In some embodiments, the gate structures 248 may be coupled to other electronic circuits by other contacts, vias, metal structures, etc. (e.g., within dielectric layer 232, but not shown in FIG. 2F).

Figure 3A:
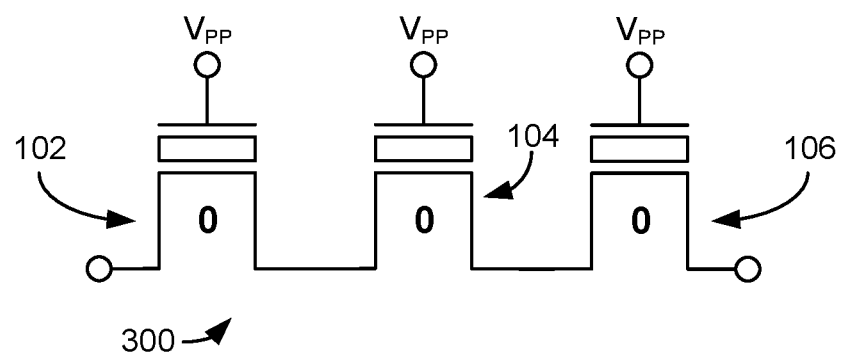
Figure 3B:
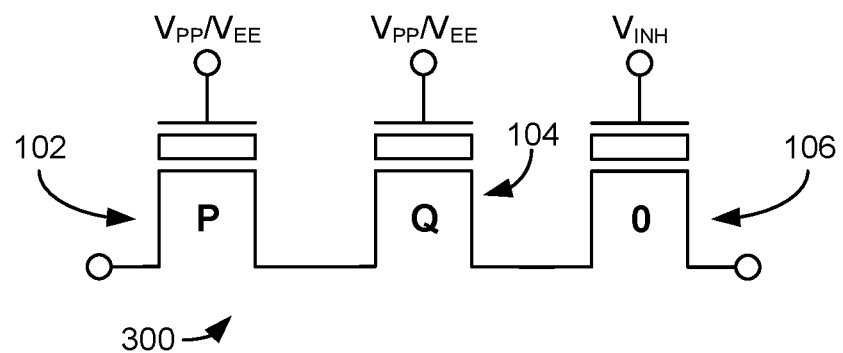

As the IMPLY logic function is generally considered to be functionally complete, one or more IMPLY functions may be employed to perform other logic functions, such as NOT, NAND, NOR, AND, OR, XOR, and so on. For example, FIGS. 3A through 3G illustrate a series of operations using an IC memory device 300 that includes three charge-trapping devices 102, 104, and 106 to implement a two-input NAND function using multiple IMPLY functions. As shown in FIG. 3A, in some embodiments, the gates of the charge-trapping devices 102, 104, and 106 may be set to programming voltage $V_{PP}$ (e.g., associated with a "programming" state for each charge-trapping device 102, 104, and 106) to store the state of 0 (low) in each of the charge-trapping devices 102, 104, and 106. In FIG. 3B, the gate of the first charge-trapping device 102 may then be set to $V_{PP}$ (the "programming" state for the first charge-trapping device 102) or $V_{EE}$ (the "erasing" state for the first charge-trapping device 102) to store a corresponding state P of 0 or 1, respectively. Concurrently, the gate of the second charge-trapping device 104 may be set to $V_{PP}$ or $V_{EE}$ to store a corresponding state Q of 0 or 1, respectively. Also at that time, the gate of the third charge-trapping device 106 may be set to an inhibiting voltage VINH (e.g., associated with an "inhibiting" state) that prevents the current state (0) of the third charge-trapping device 106 from changing while the first and second charge-trapping devices 102 and 104 are being programmed to the P and Q states, respectively.

Figures 3C, 3D:
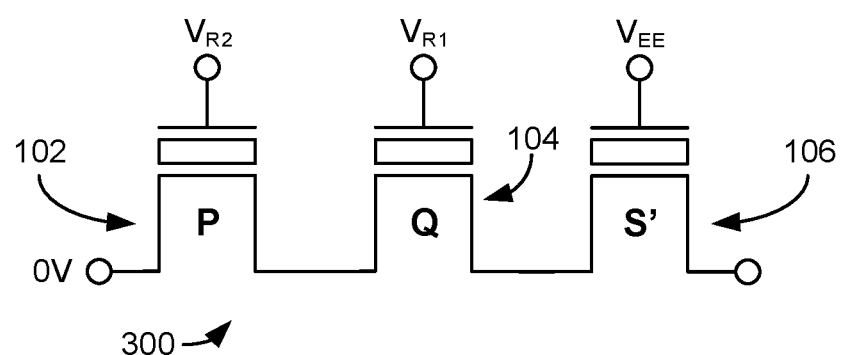

Thereafter, as shown in FIG. 3C, the gate of the first charge-trapping device 102 may be set to $V_{R2}$ (thus turning the first charge-trapping device 102 ON without disturbing its stored state P) and the gate of the second charge-trapping device 104 may be set to $V_{R1}$ (thus placing the second charge-trapping device 104 in its read state to allow the output of its drain to be set based on its stored state Q). Concurrently, the gate of the third charge-trapping device 104 may be set to $V_{EE}$ (for the erasing state to possibly set the current state(S) of the third charge-trapping device 106 to "erased" based on the expressed state Q of the second charge-trapping device 104).

FIG. 3D provides a truth table describing the result S' that is stored in the third charge-trapping device 106 as a result of the attempted erasure operation indicated in FIG. 3C. More specifically, if the state of the second charge-trapping device 104 (Q) is low or 0, the second charge-trapping device 104 is ON when its gate is set to $V_{R1}$ to place the second charge-trapping device 104 in its read state, thus enabling the erasure of the third charge-trapping device 106, resulting in its stored state S' being erased (e.g., high or 1). If, instead, the state of the second charge-trapping device 104 (Q) is high or 1, the first charge-trapping device 102 is OFF when the gate is set to $V_{R1}$, thus disabling the erasure of the second charge-trapping device 104, resulting in its stored state S' remaining equal to its previous state of 0. Accordingly, the resulting stored state S' is an inverse of Q (S'=Q IMP 0=NOT Q).

Thereafter, FIG. 3E indicates the use of an additional IMPLY operation of P IMP S'. To perform this function, in some embodiments, the gates of the first, second, and third charge-trapping devices 102, 104, and 106 may be set to $V_{R1}$, $V_{R2}$, and $V_{EE}$, respectively. As a result, the state P of the first charge-trapping device 102 is expressed at its drain, and the second charge-trapping device 104 is turned ON, thus passing the state P of the first charge-trapping device 102 to the third charge-trapping device 106 while the second charge-trapping device 104 maintains its current state Q. Accordingly, the gate of the third charge-trapping device 104 being set to $V_{EE}$ possibly enables the erasure of the current state (S') of the third charge-trapping device 106 based on the expressed state P of the first charge-trapping device 102.

FIG. 3F provides a truth table describing the result S" that is stored in the third charge-trapping device 106 as a result of the attempted erasure operation indicated in FIG. 3E. More specifically, if the state of the first charge-trapping device 102 (P) is low or 0, the erasure of the third charge-trapping device 106 is enabled, resulting in its stored state S" being erased (e.g., high or 1). If, instead, the state of the first charge-trapping device 102 (P) is high or 1, the first charge-trapping device 102 is OFF when the gate is set to $V_{R1}$ to place the first charge-trapping device 102 in the read state, thus disabling the erasure of the third charge-trapping device 106, resulting in its stored state S" remaining equal to its previous state S'. Accordingly, the resulting stored state S"=P IMP S'=P IMP (Q IMP 0)=P NAND Q.

Thereafter, as depicted in FIG. 3G, the new state S" of the third charge-trapping device 106 may be output by way of its drain by setting the gates of the first and second charge-trapping devices 102 and 104 to $V_{R2}$ (thus turning the first and second charge-trapping devices 102 and 104 ON while retaining their respective states P and Q), and setting the gate of the third charge-trapping device 106 to $V_{R1}$, thereby outputting the state S" of the third charge-trapping device 106 via its drain connection.

Figure 3H:
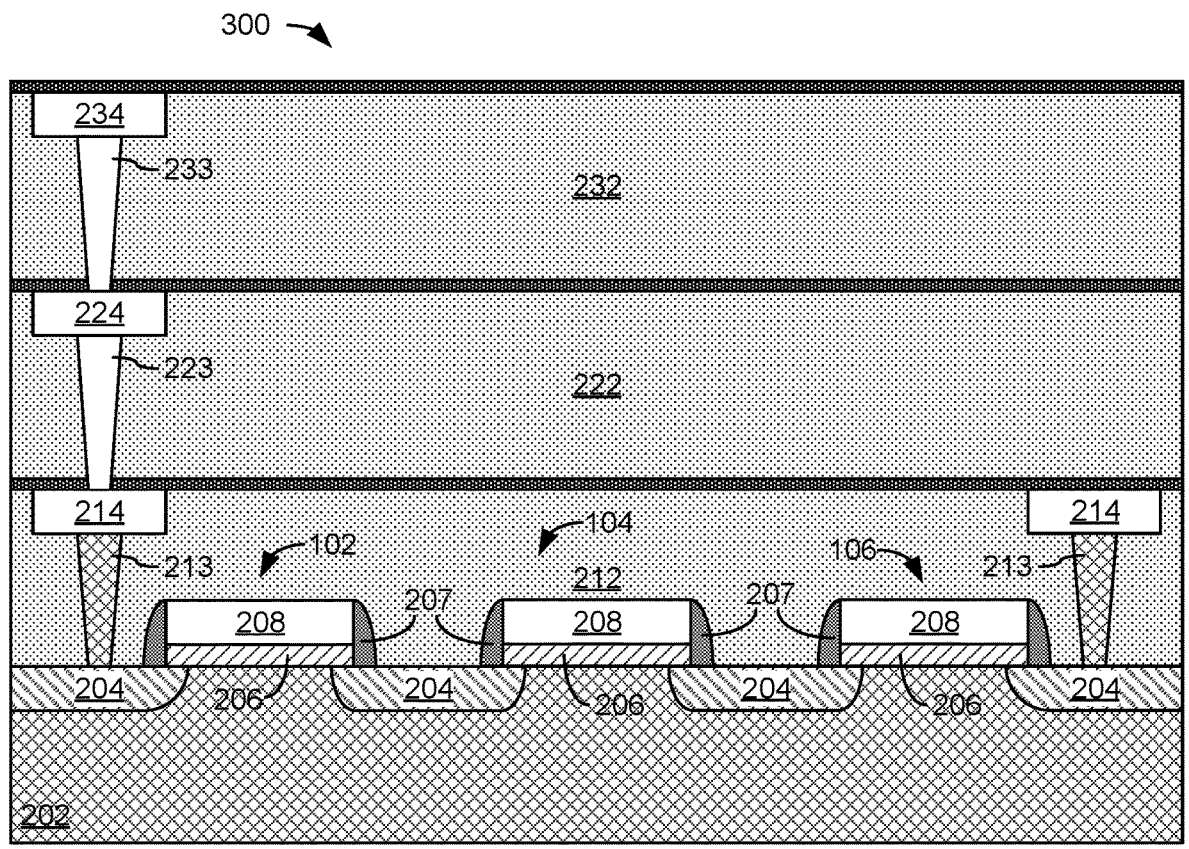
FIG. 3H illustrates a cross-sectional view of some embodiments of the portion of an IC memory device of FIG. 3A resulting from FEOL processing.

FIG. 3H illustrates a cross-sectional view of some embodiments of the portion of the IC memory device 300 of FIG. 3A resulting from FEOL processing. A substrate 202 may include four source-drain regions 204 (e.g., doped regions). In some embodiments, in a manner similar to that shown in FIG. 2E, each of a plurality of charge-trapping structures 206 may be formed above the substrate 202 to join a corresponding pair of adjacent source-drain regions 204, and a gate structure 208 may be formed over each charge-trapping structure 206. Each gate structure 208, charge-trapping structure 206, and associated pair of source-drain regions 204 may thus form a corresponding one of the charge-trapping devices 102, 104, and 106 coupled in series.

Furthermore, in some embodiments, each charge-trapping structure 206 and associated gate structure 208 may be surrounded by a spacer 207. Also, in some embodiments, at least the source-drain regions 204 at opposing ends of the serially-coupled charge-trapping devices 102, 104, and 106 may be connected to other circuitry using contacts 213, vias 223 and 233, and metal structures 214, 224, and 234 located in one or more dielectric layers 212, 222, and 232. In some embodiments, each of the gate structures 208 may be coupled by way of contacts, vias, and metal structures not shown in FIG. 3H (e.g., to control circuit 105 of FIG. 1A) to control the charge-trapping devices 102, 104, and 106, as described herein.

Figure 3I:
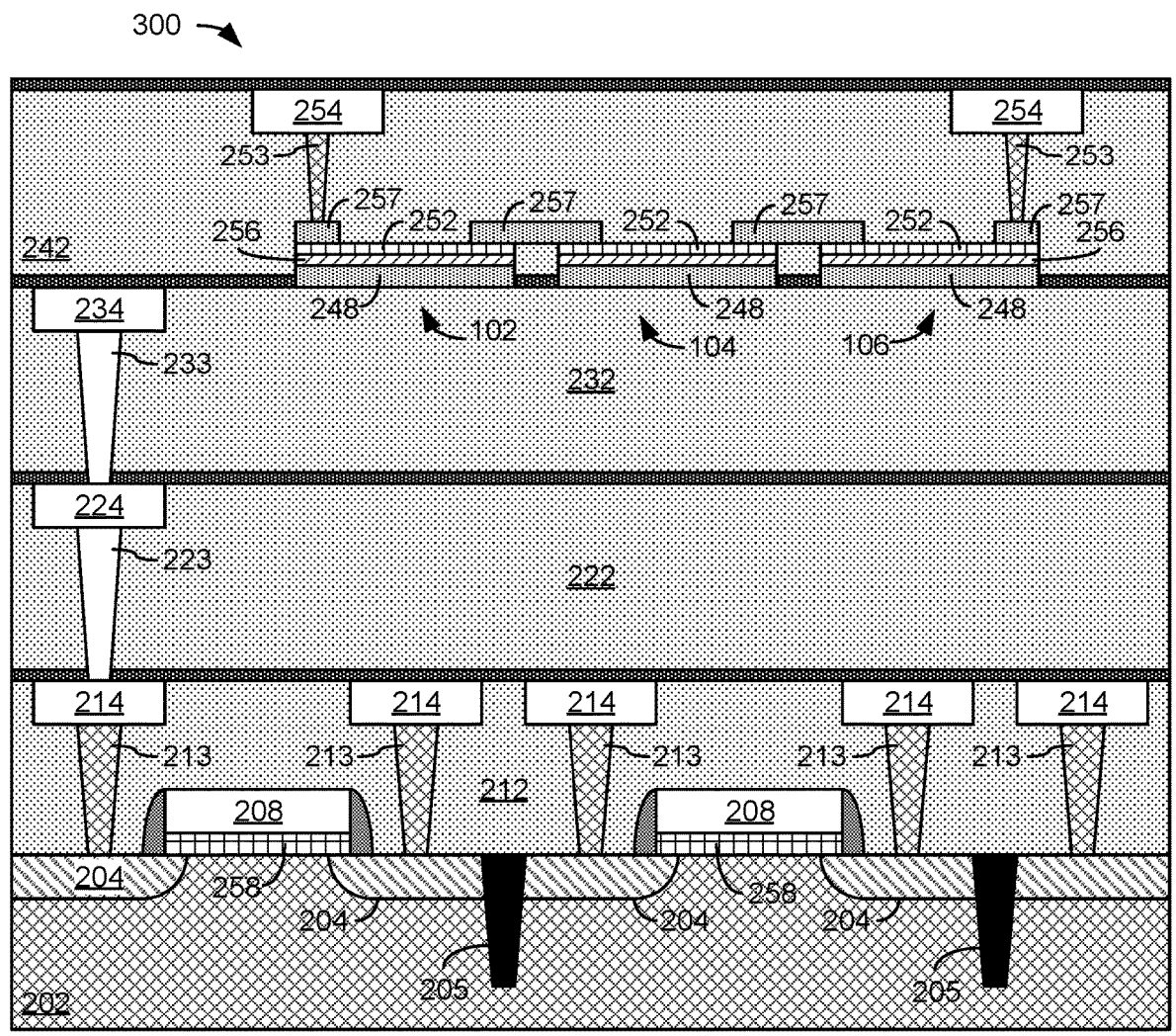
FIG. 3I illustrates a cross-sectional view of some embodiments of the portion of the IC memory device of FIG. 3A resulting from BEOL processing.

FIG. 3I illustrates a cross-sectional view of some embodiments of the portion of the IC memory device 300 of FIG. 3A resulting from BEOL processing. In some embodiments, the substrate 202 may include source-drain regions 204 that have been doped, implanted, or the like. However, in this case, at least some adjacent pairs of the source-drain regions 204 may be bridged via a dielectric structure 258 and an associated gate structure 208 to create a MOSFET not directly associated with charge-trapping devices, as described herein. Further, in some embodiments, the MOSFETS may not be serially coupled, but may instead by isolated from each other by way of a non-conductive plug 205 formed in the substrate 202 through one of the source-drain regions 204, as described above in conjunction with FIG. 2F. Additionally, in some embodiments, the sources and drains of the MOSFETs may be coupled to other circuitry by way of contacts 213, vias 223 and 233, and associated metal structures 214, 224, and 234 located in one or more dielectric layers 212, 222, and 232. In some embodiments, each of the gate structures 208 may be coupled by way of contacts, vias, and metal structures not shown in FIG. 3I to control the MOSFETs.

In FIG. 3I, the charge-trapping devices 102 and 104 may be formed in an upper layer (e.g., dielectric layer 242 over dielectric layer 232) of the IC memory device 300 using thin-film transistor (TFT)-related processes instead of at the substrate 202. In some embodiments, a gate structure 248 is formed over a dielectric layer (e.g., dielectric layer 232) for each of the charge-trapping devices 102 and 104. Also, a corresponding charge-trapping structure 256 may be formed over each gate structure 248. Additionally, a corresponding channel structure 252 may be formed over each charge-trapping structure 256. A plurality of source-drain structures 257 may also be formed over the channel structures 252 such that the channel structures 252 are bridged by one of the source-drain structures 257, and each end of the channel structures 252 at opposing ends of the serially-coupled charge-trapping devices 102 and 104 is covered with a corresponding one of the source-drain structures 257. Further, in some embodiments, at least the source-drain structures 257 at the opposing ends of the serially-coupled charge-trapping devices 102 and 104 may be coupled to other circuitry (e.g., control circuit 105 of FIG. 1A) by way of contacts 253 and metal structures 254. In some embodiments, the gate structures 248 may be coupled to other electronic circuits by other contacts, vias, metal structures, etc. (e.g., within dielectric layer 232, but not shown in FIG. 3I).

Figure 4:
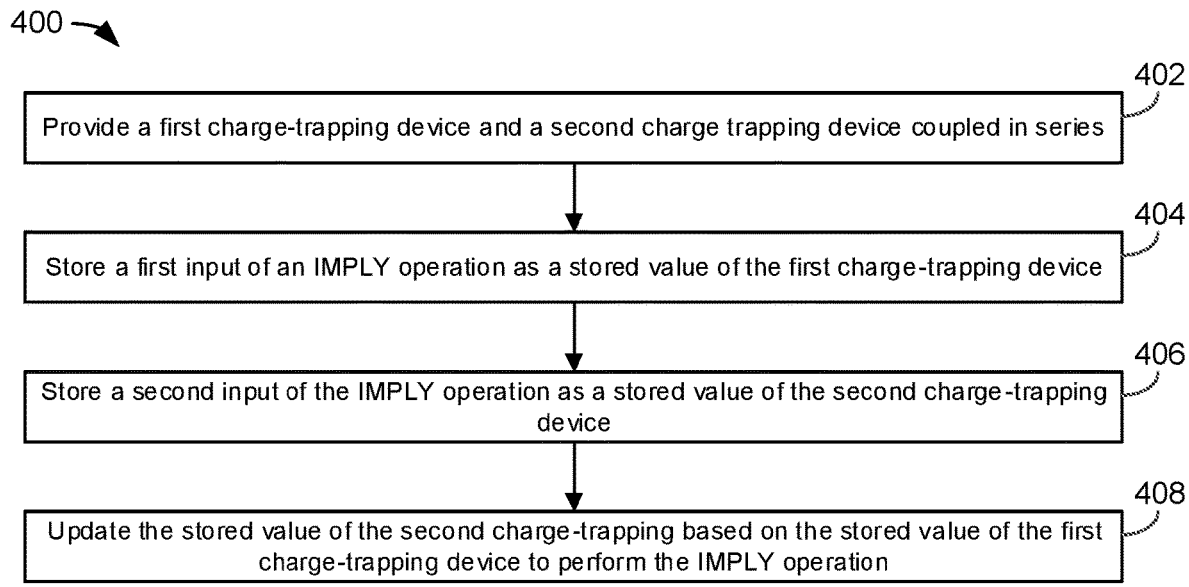
FIG. 4 illustrates a methodology in flowchart format that illustrates some embodiments of operation of the IC memory device of FIGS. 2A-2F.

FIG. 4 illustrates a methodology 400 in flowchart format that illustrates some embodiments of operation of the IC memory device 100 of FIGS. 2A-2F. Although this method and other methods illustrated and/or described herein are illustrated as a series of acts or events, it will be appreciated that the present disclosure is not limited to the illustrated ordering or acts. Thus, in some embodiments, the acts may be carried out in different orders than illustrated, and/or may be carried out concurrently. Further, in some embodiments, the illustrated acts or events may be subdivided into multiple acts or events, which may be carried out at separate times or concurrently with other acts or sub-acts. In some embodiments, some illustrated acts or events may be omitted, and other un-illustrated acts or events may be included.

At act 402, a first charge-trapping device and a second charge trapping device coupled in series (e.g., charge-trapping devices 102 and 104 of FIG. 1A) are provided. At act 404, a first input of an IMPLY operation is stored as a stored value of the first charge-trapping device (e.g., state P, as shown in FIG. 2A). At act 406, a second input of the IMPLY operation is stored as a stored value of the second charge-trapping device (e.g., state Q, as shown in FIG. 2A). At act 408, the stored value of the second charge-trapping device is updated based on the stored value of the first charge-trapping device to perform the IMPLY operation (e.g., state Q', as depicted in FIG. 2B).

Figure 5:
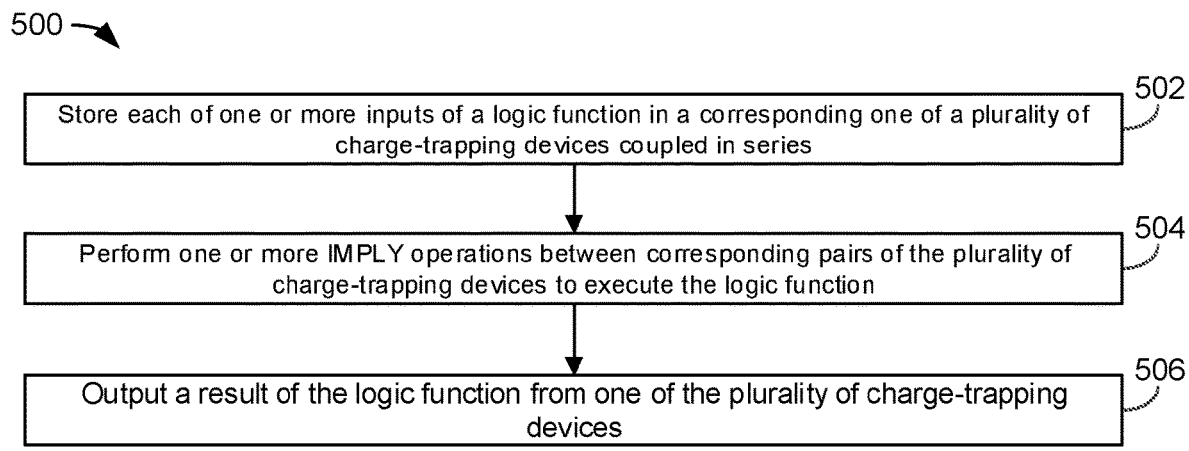
FIG. 5 illustrates a methodology in flowchart format that illustrates some embodiments of operation of the IC memory device of FIGS. 3A-3I.

FIG. 5 illustrates a methodology 500 in flowchart format that illustrates some embodiments of operation of the IC memory device 300 of FIGS. 3A-3I. At act 502, each of one or more inputs of a logic function is stored in a corresponding one of a plurality of charge-trapping devices coupled in series (e.g., charge-trapping devices 102, 104, and 106 of FIG. 3A, storing states P, Q, and 0, respectively, as shown in FIG. 3B). At act 504, one or more IMPLY operations are performed between corresponding pairs of the plurality of charge-trapping devices to execute the logic function (e.g., as shown in FIGS. 3C through 3F, producing state S"). At act 506, a result of the logic function is output from one of the plurality of charge-trapping devices.

Figure 6:
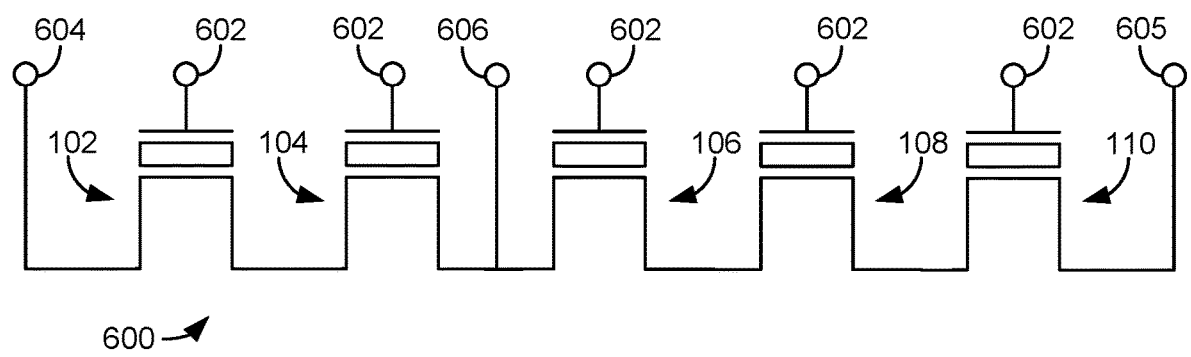
FIG. 6 illustrates a schematic view of some embodiments of a portion of an IC memory device including five charge-trapping devices to implement a logic function using one or more IMPLY functions, according to the present disclosure.

FIG. 6 illustrates a schematic view of some embodiments of a portion of an IC memory device 600 including five charge-trapping devices 102, 104, 106, 108, and 110 to implement one or more logic functions using one or more IMPLY functions, while also serving as memory cells, according to the present disclosure. While five charge-trapping devices are depicted in FIG. 6, any number of charge-trapping devices greater than two may be employed in other embodiments. For example, in FIG. 6, first and second charge-trapping devices 102 and 104 may be employed to perform an IMPLY function (e.g., as described above in conjunction with FIGS. 2A through 2D) and/or third through fifth charge-trapping devices 106, 108, and 110 may be used to perform a NAND function (e.g., as discussed above in connection with FIGS. 3A through 3G).

In FIG. 6, in some embodiments, a gate connection 602 for each of the charge-trapping devices 102, 104, 106, 108, and 110 may be controlled (e.g., by control circuit 105 of FIG. 1A). In addition, a first source-drain connection 604 of the first charge-trapping device 102 and a second source-drain connection 605 of the fifth charge-trapping device 110, in conjunction with gate connections 602, may facilitate logic and/or output control for the five charge-trapping devices 102, 104, 106, 108, and 110 with respect to their logic and/or memory functions. In addition, at least one additional source-drain connection 606 coupling two adjacent charge-trapping devices (e.g., charge-trapping devices 104 and 106) may provide one or more outputs (e.g., one or more outputs of at least one logic function implemented by the charge-trapping devices 102, 104, 106, 108, and 110). While FIG. 6 shows a single additional source-drain connection 606, other embodiments may include multiple additional source-drain connections 606 involving multiple pairs of charge-trapping devices.

Consequently, in some embodiments, as illustrated in FIG. 6, a series of charge-trapping devices may be operated as a typical series-coupled IC memory device (e.g., a NAND memory) and concurrently serve as an IC logic device, such as for an in-memory computing architecture. Such embodiments may maintain the IC footprint typically consumed by the charge-trapping devices of an IC memory device (e.g., by providing the logical functions in the IC memory device via a separate control circuit of the IC memory device).

Figure 7D:
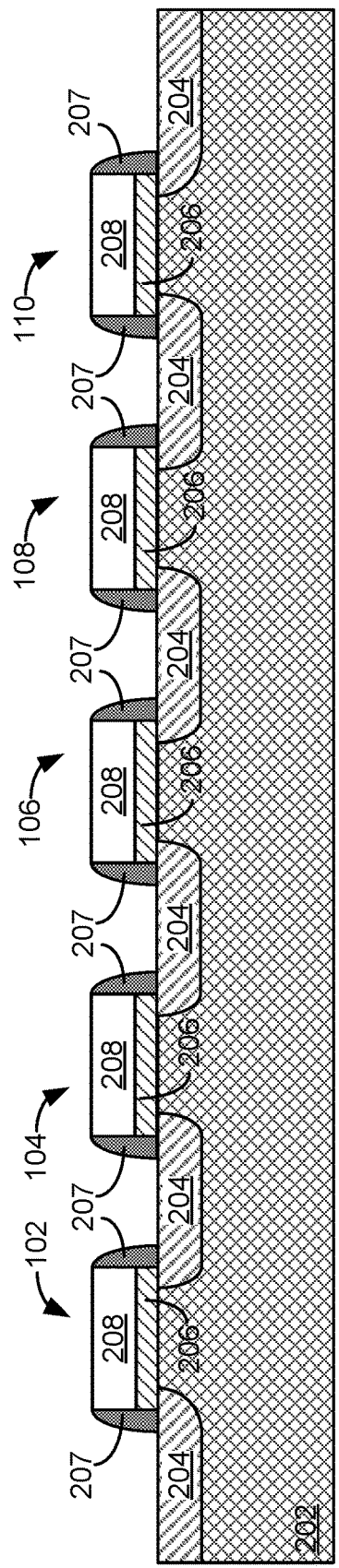

FIGS. 7A through 7F illustrate a series of incremental manufacturing steps as a series of cross-sectional views of the IC memory device 600 of FIG. 6 resulting from FEOL processing. FIG. 7A provides a substrate 202 as a basis upon which the resulting IC memory device 600 may be constructed. In some embodiments, the substrate 202 may be p-doped silicon, but other materials may be used in other embodiments.

In FIG. 7B, a plurality of doped regions 204 (e.g., n-doped regions) may be formed (e.g., via ion implantation) in the substrate 202. Also, in some embodiments, as depicted in FIG. 7C, each of a plurality of charge-trapping structures 206 (e.g., a ferroelectric structure including ferroelectric material) may be formed over the substrate 202 to bridge two consecutive doped regions 204. As also illustrated in FIG. 7C, in some embodiments, a gate structure 208 may be formed over each of the charge-trapping structures 206, resulting in the formation of the charge-trapping devices 102, 104, 106, 108, and 110 of FIG. 6. Additionally, in FIG. 7D, a spacer may be formed (e.g., conformally) about each charge-trapping structure 206 and associated gate structure 208.

Figure 7E:
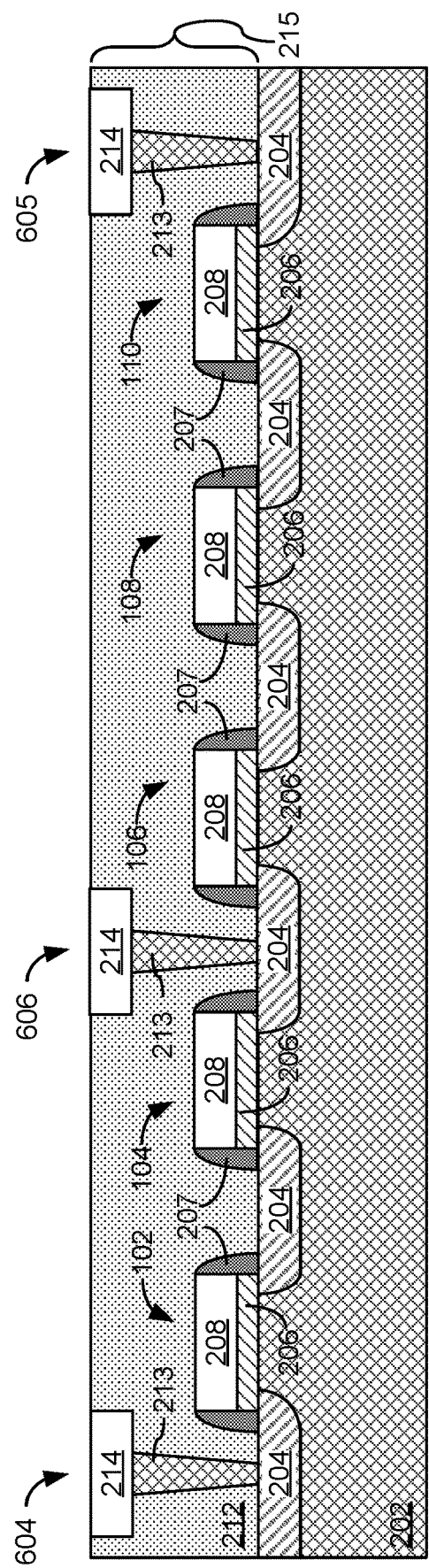
Figure 7F:
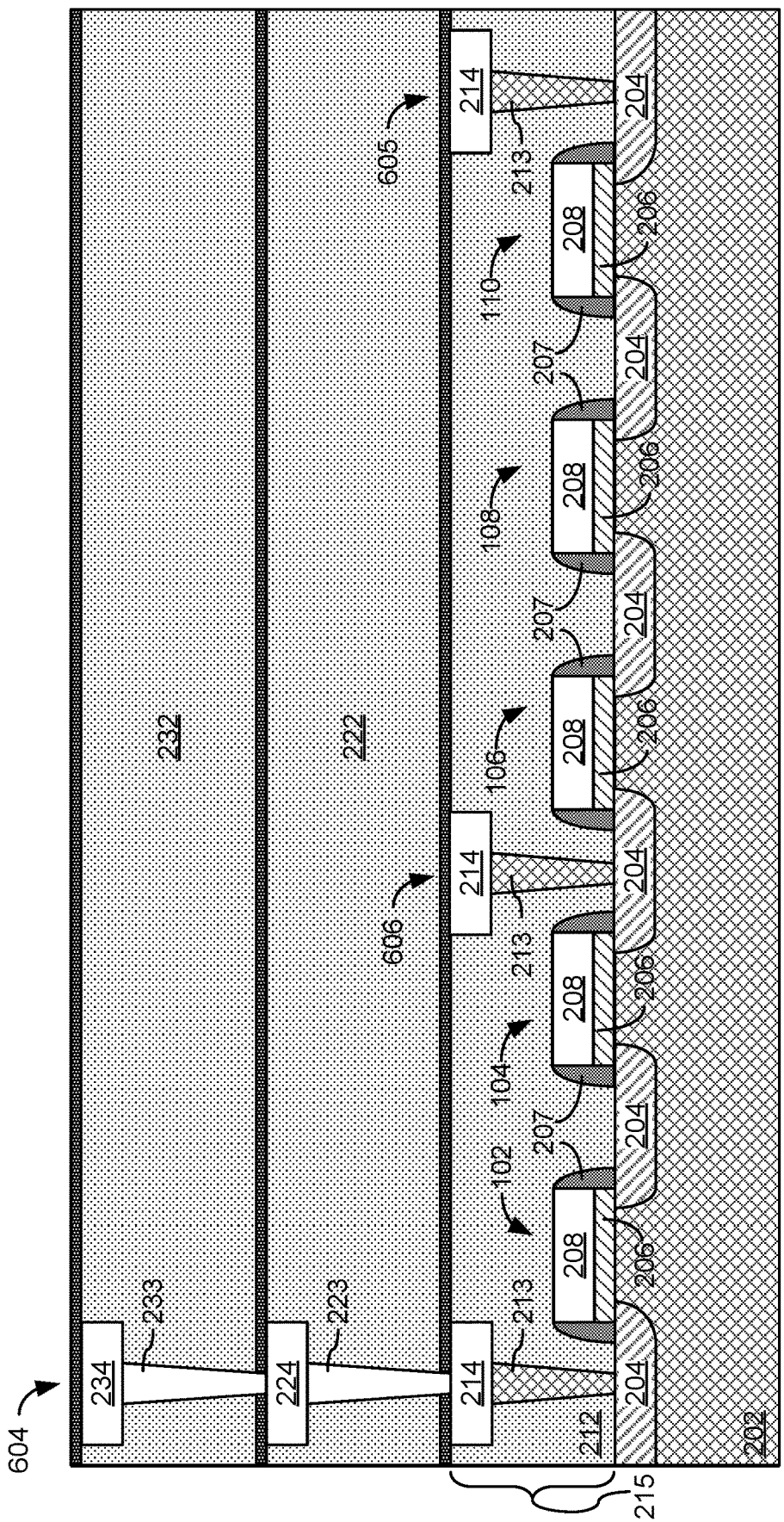

In some embodiments, in FIG. 7E, in some embodiments, a dielectric layer 212 (e.g., an oxide, such as silicon dioxide) may be formed over the substrate 202. In addition, in some embodiments, a connection structure 215 including contacts 213 and associated metal structures 214 may be coupled to the source-drain region 204 at a first end of the charge-trapping devices (e.g., first charge-trapping device 102) to form the first source-drain connection 604. Also, the connection structure 215 may be coupled to the source-drain region 204 at a second end of the charge-trapping devices (e.g., fifth charge-trapping device 110) to form the second source-drain connection 605. Furthermore, the connection structure 215 may be coupled to the source-drain region 204 associated with the second and third charge-trapping devices 104 and 106 to form the additional source-drain connection 606. Moreover, as shown in FIG. 7F, the connection structure 215 may be connected to one or more vias 223 and 233, as well as additional metal structures 224 and 234, to extend one or more of the first source-drain connection 604, the second source-drain connection 605, and/or the additional source-drain connection 606. In some embodiments, the gate structures 208 may be coupled to other electronic circuits by other contacts, vias, metal structures, etc. (e.g., within dielectric layer 212, but not shown in FIGS. 7E and 7F).

Figure 8:
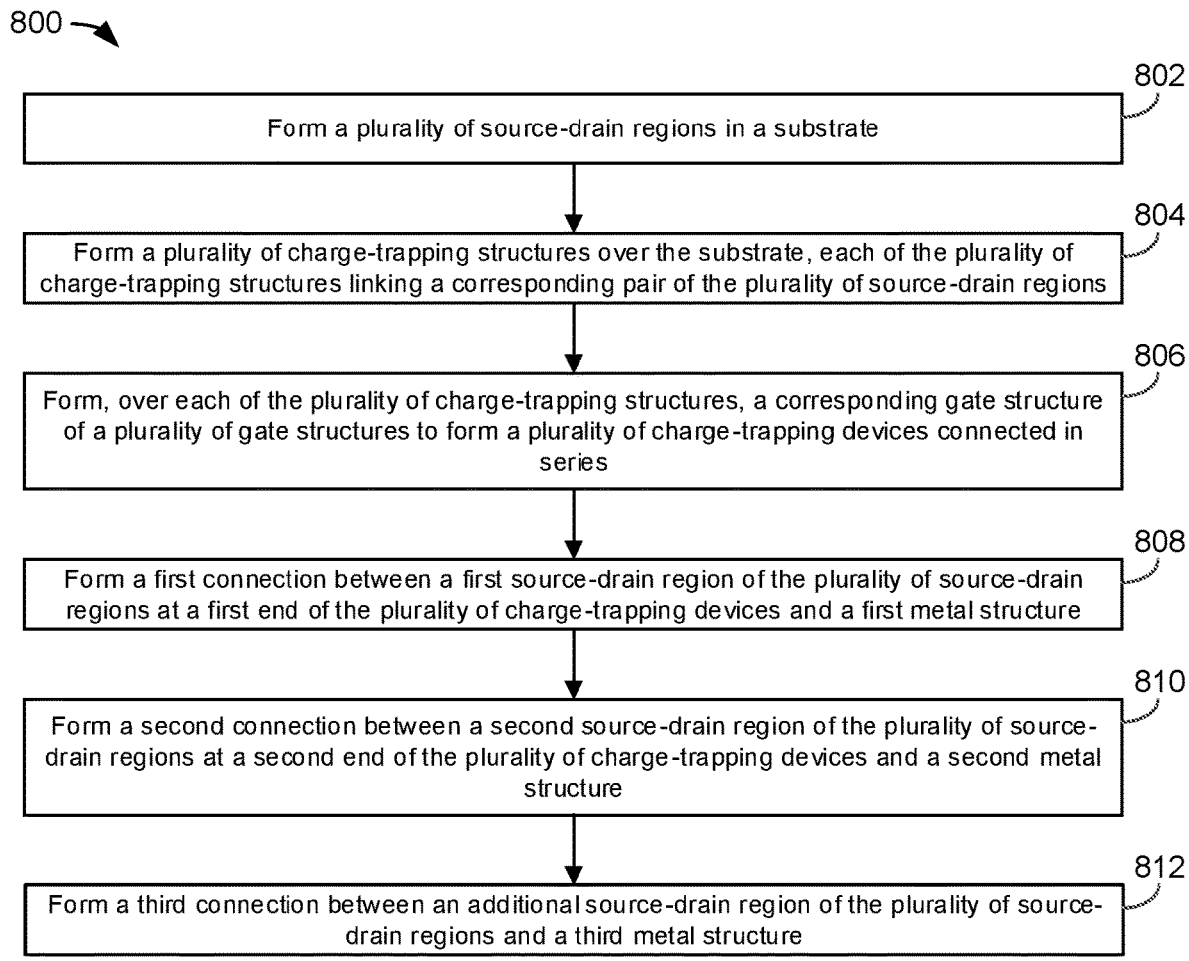
FIG. 8 illustrates a methodology in flowchart format that illustrates some embodiments of the present concept related to FIGS. 7A through 7E.

FIG. 8 illustrates a methodology 800 in flowchart format that illustrates some embodiments of the present concept.

At act 802, a plurality of source-drain regions (e.g., source-drain regions 204) may be formed in a substrate (e.g., substrate 202). FIGS. 7A and 7B illustrate cross-sectional views of some embodiments corresponding to act 802.

At act 804, a plurality of charge-trapping structures (e.g., charge-trapping structures 206) may be formed over the substrate 202. FIG. 7C illustrates a cross-sectional view of some embodiments corresponding to act 804.

At act 806, a corresponding gate structure (e.g., gate structure 208) may be formed over each charge-trapping structure 206. FIGS. 7C and 7D illustrate cross-sectional views of some embodiments corresponding to act 806.

At act 808, a first connection (e.g., first source-drain connection 604) is formed between a first source-drain region at a first end of the plurality of charge-trapping devices and a first metal structure. FIG. 7E illustrates a cross-sectional view of some embodiments corresponding to act 808.

At act 810, a second connection (e.g., second source-drain connection 605) is formed between a second source-drain region at a second end of the plurality of charge-trapping devices and a second metal structure. FIG. 7E illustrates a cross-sectional view of some embodiments corresponding to act 810.

At act 812, a third connection (e.g., additional source-drain connection 606) is formed between an additional source-drain region of the plurality of source-drain regions and a third metal structure. FIG. 7E illustrates a cross-sectional view of some embodiments corresponding to act 812.

Figure 9A:
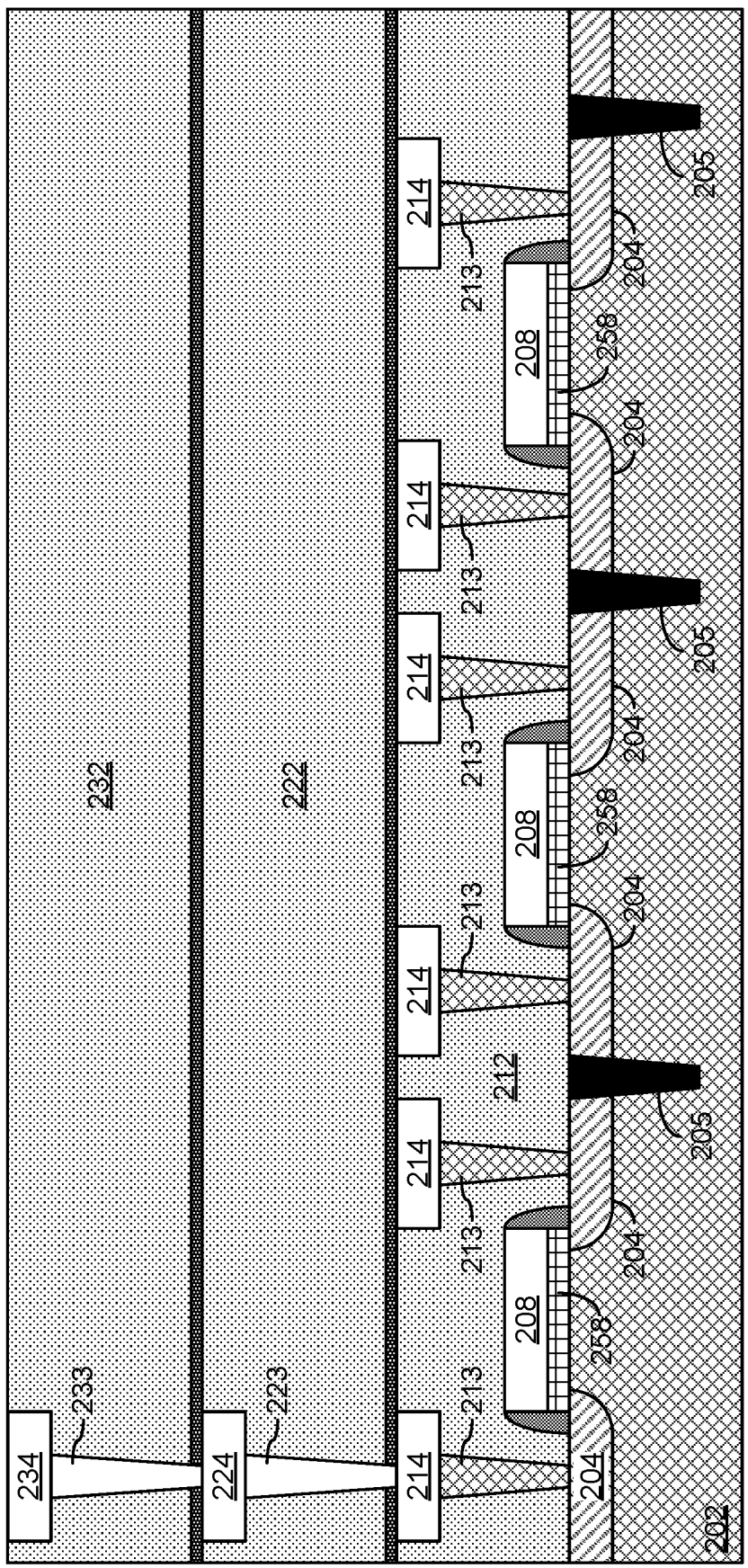
FIGS. 9A through 9F illustrate some embodiments of a series of incremental manufacturing steps as a series of cross-sectional views of the IC memory device of FIG. 6 resulting from BEOL processing.

FIGS. 9A through 9F illustrate a series of incremental manufacturing steps as a series of cross-sectional views of the IC memory device 600 of FIG. 6 resulting from BEOL processing. FIG. 9A shows a starting structure at which the BEOL processing for the IC memory device 600 may begin. More specifically, FIG. 9A illustrates a plurality of MOSFETs that include source-drain regions 204, dielectric structures 258, gate structures 208, and non-conductive plugs 205 in a substrate 202, atop of which are formed multiple contacts 213, vias 223 and 233, and metal structures 214, 224, and 234 within dielectric layers 212, 222, and 232.

Figure 9B:
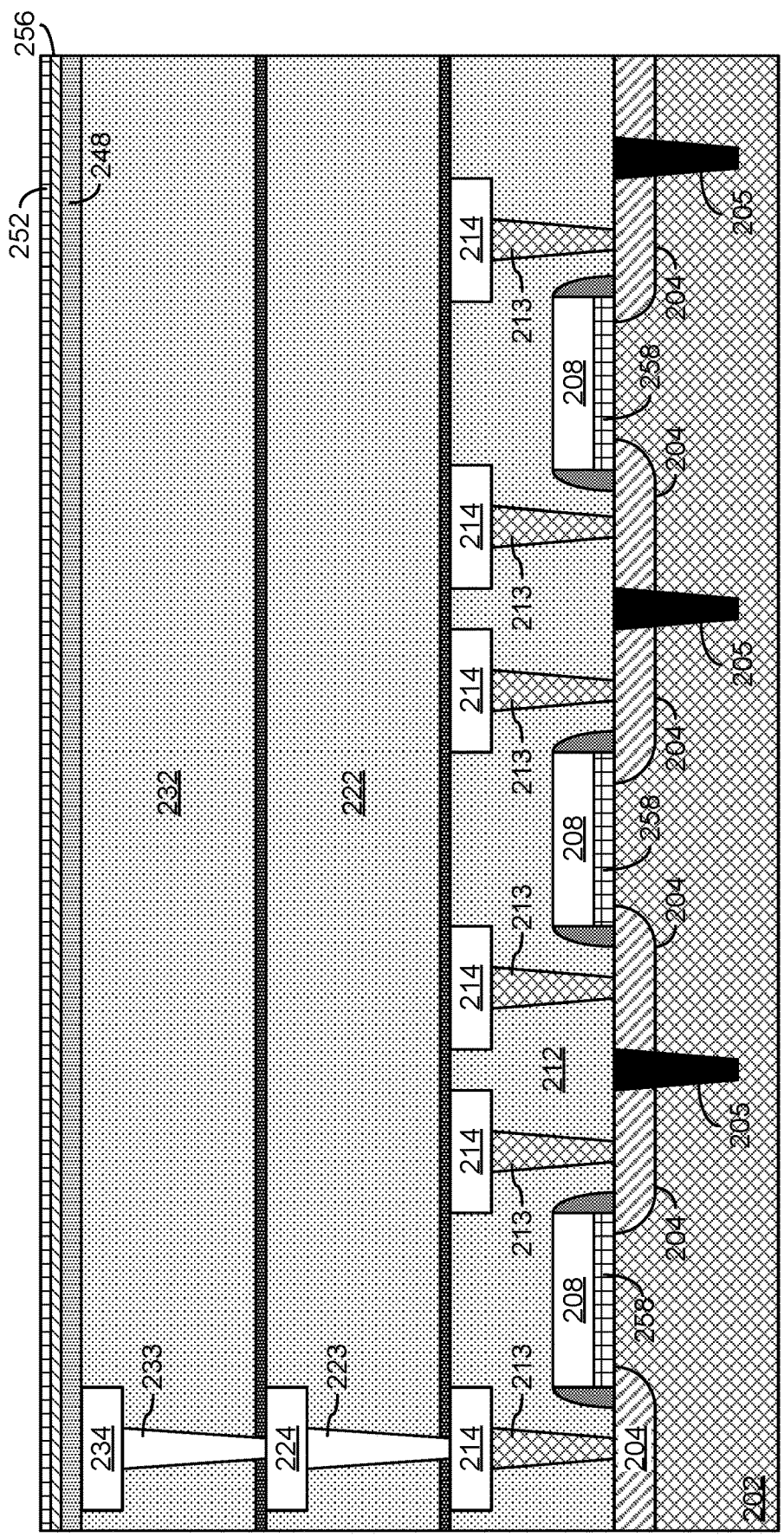
Figure 9C:
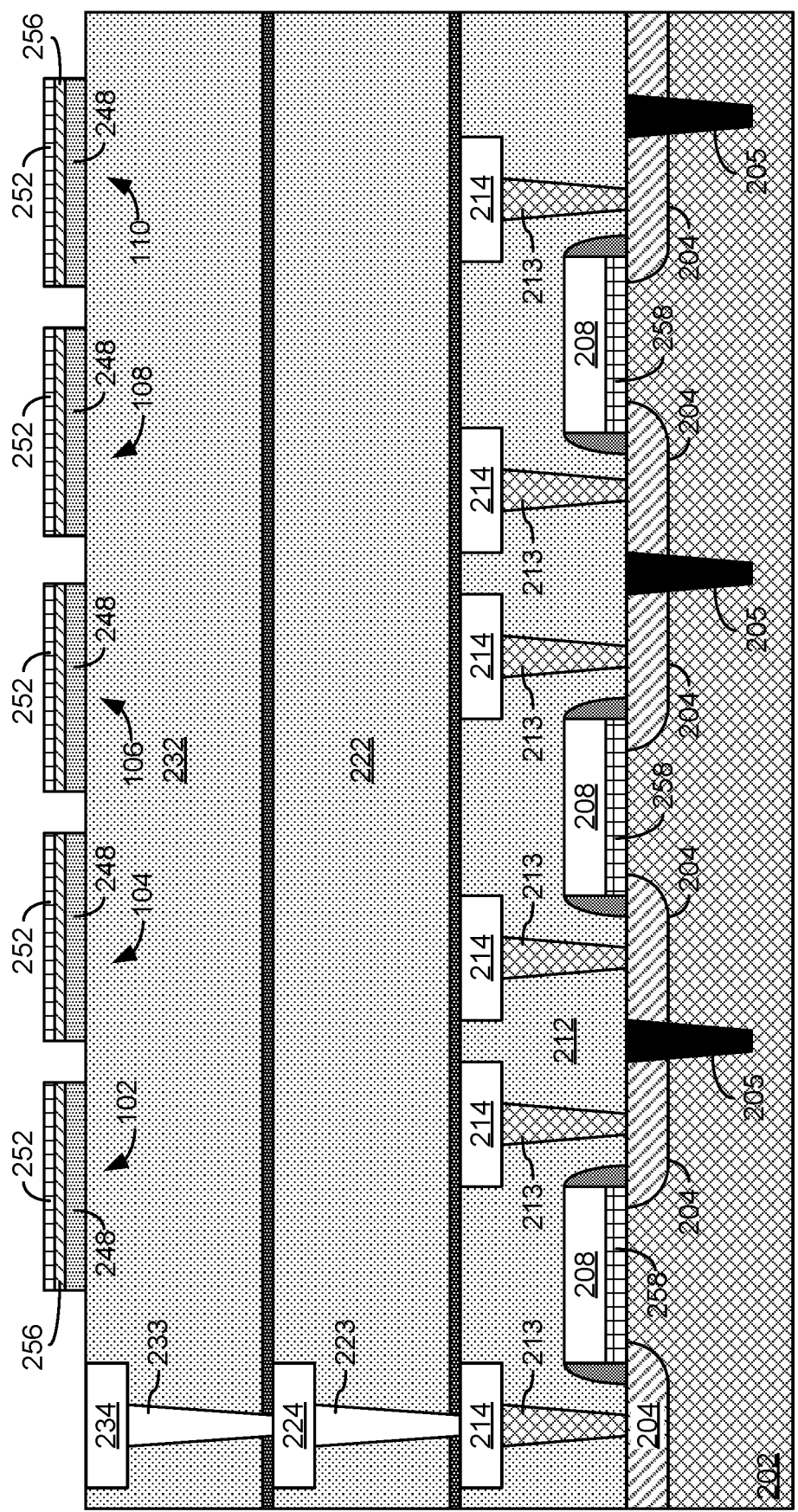
Figure 9D:
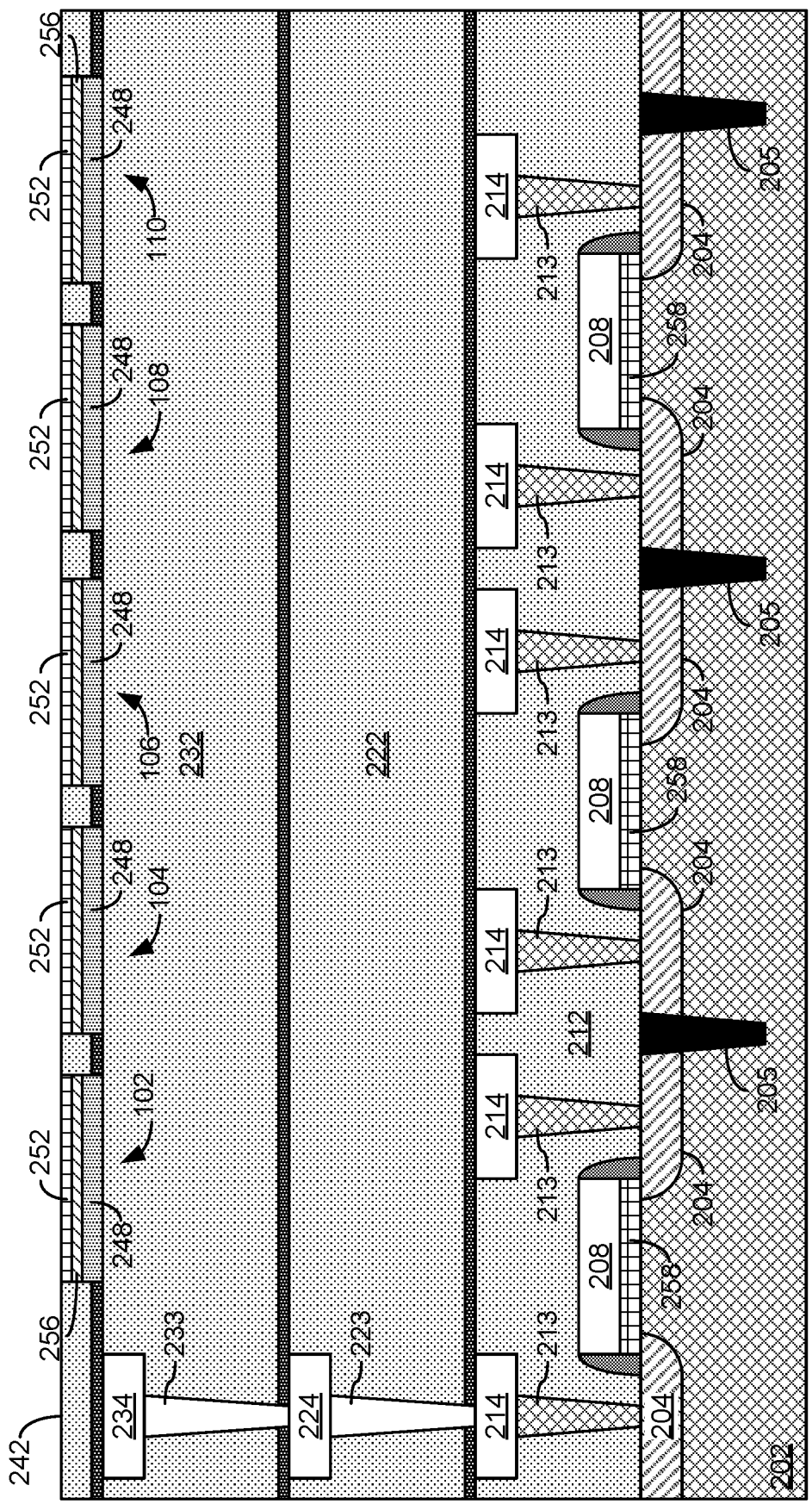

In FIG. 9B, a gate structure 248, a charge-trapping structure 256, and a channel structure 252 may be formed as layers over the dielectric layer 232. As shown in FIG. 9C, the gate structure 248, the charge-trapping structure 256, and the channel structure 252 may be patterned, etched, or the like to form multiple (e.g., five) gate structures 248, charge-trapping structures 256, and channel structures 252, each of which is associated with a corresponding charge-trapping device 102, 104, 106, 108, and 110. In other embodiments, one or more of the gate structure 248, the charge-trapping structure 256, and the channel structure 252 of FIG. 9B may be patterned or etched individually. In FIG. 9D, a dielectric layer 242 may be added to fill areas not occupied by the gate structures 248, charge-trapping structures 256, and channel structures 252. In some embodiments, the resulting top surface of FIG. 9D may also be planarized (e.g., via chemical mechanical planarization (CMP)) to facilitate the forming of additional layers or structures.

Figure 9E:
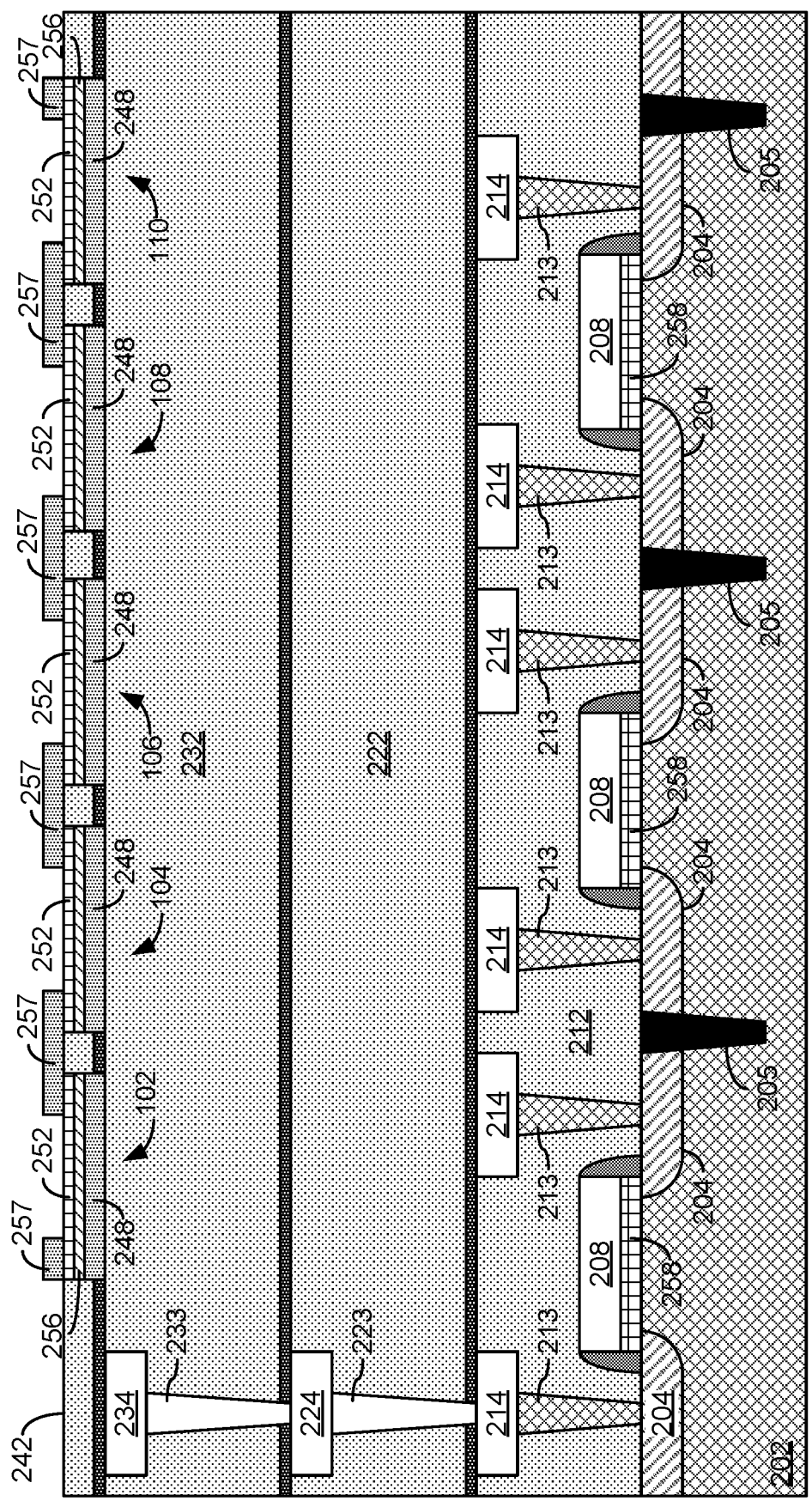

Thereafter, in FIG. 9E, a plurality of source-drain structures 257 may be formed over the channel structures 252 such that the channel structures 252 are bridged by one of the source-drain structures 257, and each end of the channel structures 252 at opposing ends of the serially-coupled charge-trapping devices (e.g., at charge-trapping device 102 and 110) is covered with a corresponding one of the source-drain structures 257.

Figure 9F:
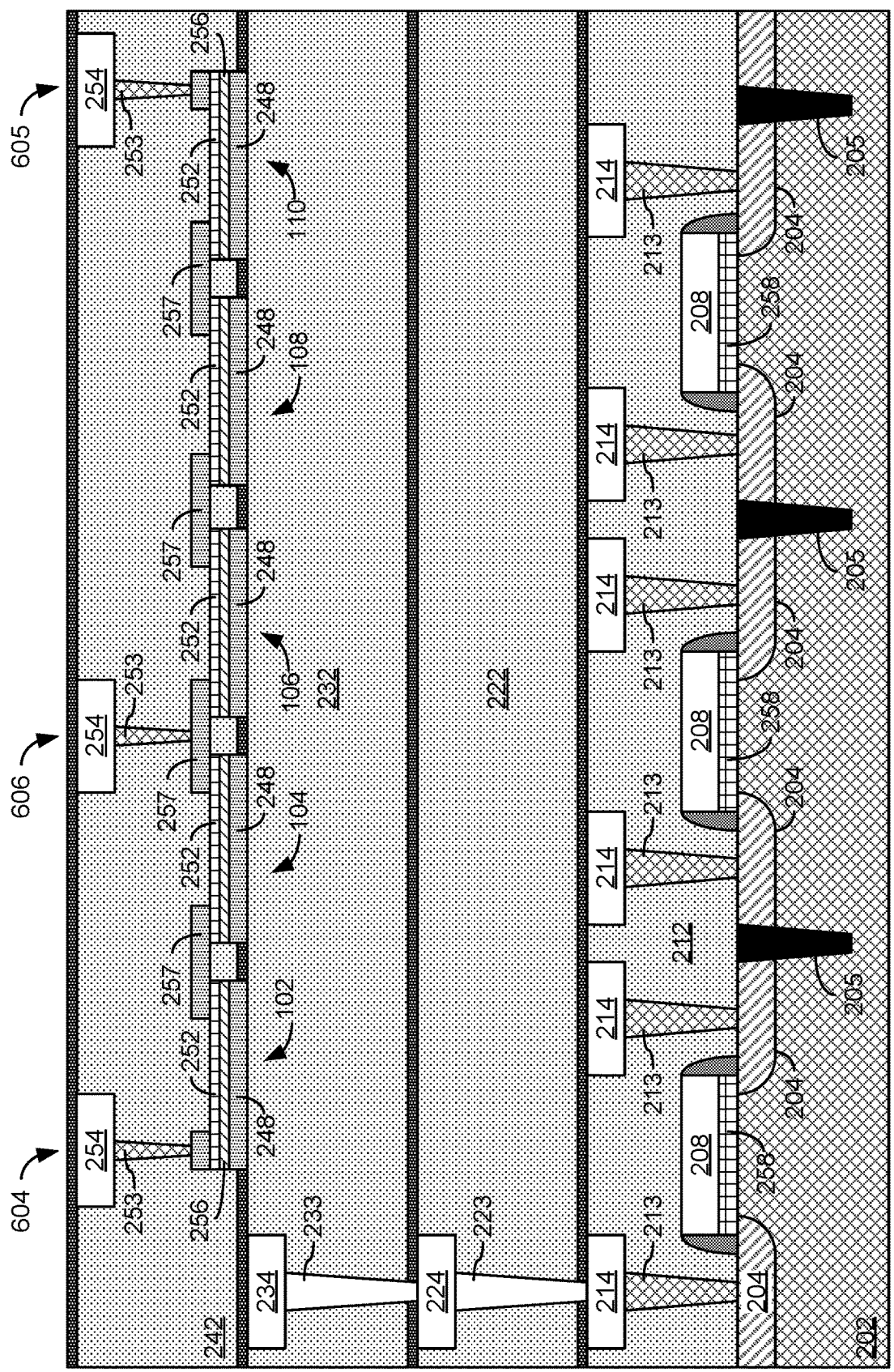

In FIG. 9F, in some embodiments, additional dielectric material of dielectric layer 242 may be added, in which contacts 253 and metal structures 254 may be added to form a first source-drain connection 604 at a first end of the source-drain structures 257 (e.g., at the first charge-trapping device 102), a second source-drain connection 605 at a second (opposing) end of the source-drain structures 257 (e.g., at the fifth charge-trapping device 110), and a third source-drain connection 606 at an additional source-drain structure (e.g., shared by charge-trapping devices 104 and 106). Further, in some embodiments, the gate structures 248 may be coupled to other electronic circuits by other contacts, vias, metal structures, etc. (e.g., within dielectric layer 232, but not shown in FIG. 9F).

Figure 10:
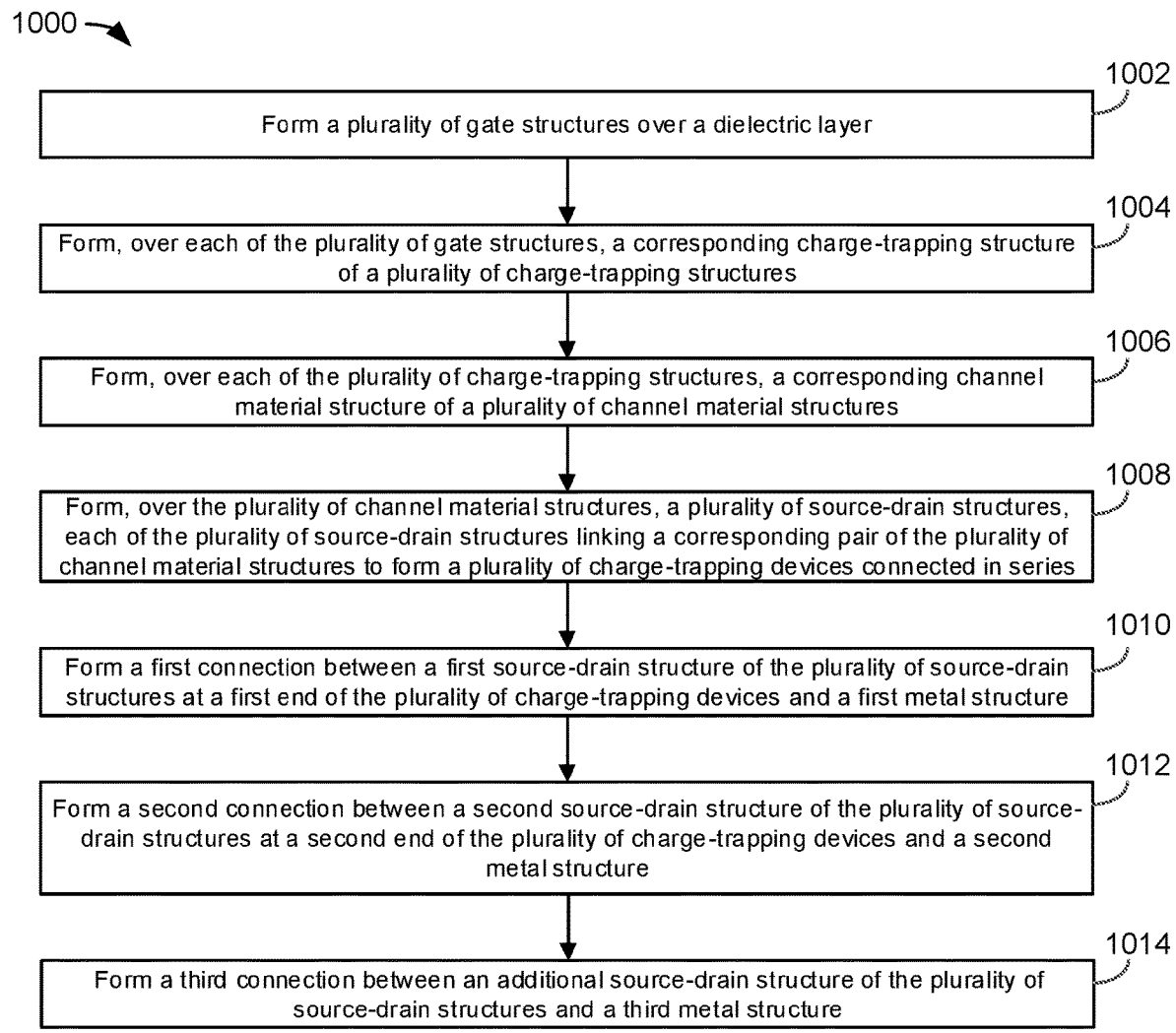
FIG. 10 illustrates a methodology in flowchart format that illustrates some embodiments of the present concept related to FIGS. 9A through 9F.

FIG. 10 illustrates a methodology 1000 in flowchart format that illustrates some embodiments of the present concept. Acts 1002 through 1014 may correspond, for example, to the structure illustrated in FIGS. 9A through 9F. In some embodiments, one or more of acts 1002 through 1014 are TFT manufacturing process acts.

At act 1002, a plurality of gate structures (e.g., gate structures 248) may be formed over a dielectric layer (e.g., dielectric layer 232). FIG. 9A illustrates a cross-sectional view of some embodiments corresponding to act 1002.

At act 1004, a corresponding charge-trapping structure of a plurality of charge-trapping structures (e.g., charge-trapping structures 256) may be formed over each of the plurality of gate structures. FIGS. 9B and 9C illustrate cross-sectional views of some embodiments corresponding to act 1004.

At act 1006, a corresponding channel material structure of a plurality of channel material structures (e.g., channel structures 252) may be formed over each of the plurality of charge-trapping structures. FIGS. 9B and 9C illustrate cross-sectional views of some embodiments corresponding to act 1006.

At act 1008, a plurality of source-drain structures (e.g., source-drain structures 257) may be formed over the plurality of channel material structures. In some embodiments, each of the source-drain structures may link either a corresponding pair of the plurality of channel material structures, or be formed at a first or second end of a first or last of the channel material structures, to form a plurality of charge-trapping devices connected in series (e.g., charge-trapping devices 102, 104, 106, 108, and 110). FIG. 9E illustrates a cross-sectional view of some embodiments corresponding to act 1008.

At act 1010, a first connection (e.g., first source-drain connection 604) may be formed between a first source-drain structure of the plurality of source-drain structures at a first end of the charge-trapping devices (e.g., charge-trapping device 102) and a first metal structure (e.g., metal structure 254). FIG. 9F illustrates a cross-sectional view of some embodiments corresponding to act 1010.

At act 1012, a second connection (e.g., second source-drain connection 605) may be formed between a second source-drain structure of the plurality of source-drain structures at a second end of the charge-trapping devices (e.g., charge-trapping device 110) and a second metal structure (e.g., metal structure 254). FIG. 9F illustrates a cross-sectional view of some embodiments corresponding to act 1012.

At act 1014, a third connection (e.g., third source-drain connection 606) may be formed between an additional source-drain structure of the plurality of source-drain structures (e.g., between charge-trapping devices 104 and 106) and a third metal structure (e.g., metal structure 254). FIG. 9F illustrates a cross-sectional view of some embodiments corresponding to act 1014.

Some embodiments relate to an integrated circuit memory device that includes a first charge-trapping device, a second charge-trapping device, and a control circuit. The first charge-trapping device includes a first charge-trapping structure arranged over a substrate between a first gate structure and a first channel region. The second charge-trapping device is coupled in series with the first charge-trapping device and includes a second charge-trapping structure arranged over the substrate between a second gate structure and a second channel region. The control circuit is coupled to the first gate structure of the first charge-trapping device and the second gate structure of the second charge-trapping device. The control circuit is configured to store a first input of an IMPLY operation as a stored value of the first charge-trapping device, to store a second input of the IMPLY operation as a stored value of the second charge-trapping device, and to update the stored value of the second charge-trapping device based on the stored value of the first charge-trapping device to perform the IMPLY operation.

Some embodiments relate to an integrated circuit memory device that includes a plurality of charge-trapping devices coupled in series and a control circuit coupled to a gate connection of each of the plurality of charge-trapping devices. The control circuit is configured to store each of one or more inputs of a logic function in a corresponding one of the plurality of charge-trapping devices and to perform, using the plurality of charge-trapping devices, one or more IMPLY operations to execute the logic function. Each of the one or more IMPLY operations is performed using a stored value of each of an associated pair of the plurality of charge-trapping devices.

Some embodiments relate to a method of performing a logic function in an integrated circuit memory device. The method includes storing each of one or more inputs of the logic function in a corresponding one of a plurality of charge-trapping devices, wherein the plurality of charge-trapping devices are coupled in series. The method also includes performing, using the plurality of charge-trapping devices, one or more IMPLY operations to execute the logic function, wherein each of the one or more IMPLY operations is performed using a stored value of each of an associated pair of the plurality of charge-trapping devices. The method also includes outputting a result of the logic function from one of the plurality of charge-trapping devices.

It will be appreciated that in this written description, as well as in the claims below, the terms "first", "second", "second", "third", etc. are merely generic identifiers used for ease of description to distinguish between different elements of a figure or a series of figures. In and of themselves, these terms do not imply any temporal ordering or structural proximity for these elements, and are not intended to be descriptive of corresponding elements in different illustrated embodiments and/or un-illustrated embodiments. For example, "a first dielectric layer" described in connection with a first figure may not necessarily correspond to a "first dielectric layer" described in connection with another figure, and may not necessarily correspond to a "first dielectric layer" in an un-illustrated embodiment.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit memory device, comprising:
a first charge-trapping device comprising a first charge-trapping structure arranged over a substrate between a first gate structure and a first channel region;
a second charge-trapping device coupled in series with the first charge-trapping device, the second charge-trapping device comprising a second charge-trapping structure arranged over the substrate between a second gate structure and a second channel region; and
a control circuit coupled to the first gate structure of the first charge-trapping device and the second gate structure of the second charge-trapping device, wherein the control circuit is configured to:
store a first input of an IMPLY operation as a stored value of the first charge-trapping device;
store a second input of the IMPLY operation as a stored value of the second charge-trapping device; and
update the stored value of the second charge-trapping device based on the stored value of the first charge-trapping device to perform the IMPLY operation.

2. The integrated circuit memory device of claim 1, wherein updating the stored value of the second charge-trapping device comprises:
placing the first charge-trapping device in a read state; and
placing the second charge-trapping device in an erasing state.

3. The integrated circuit memory device of claim 1, further comprising:
a third charge-trapping device coupled in series with the second charge-trapping device, the third charge-trapping device comprising a third charge-trapping structure arranged over the substrate between a third gate structure and a third channel region, wherein the control circuit is further configured to:
output the updated value of the second charge-trapping device.

4. The integrated circuit memory device of claim 3, wherein outputting the updated value of the second charge-trapping device comprises:
placing the first charge-trapping device in an ON state; and
placing the second charge-trapping device in a read state.

5. The integrated circuit memory device of claim 1, wherein a drain of the first charge-trapping device is directly connected to a source of the second charge-trapping device.

6. The integrated circuit memory device of claim 1, wherein the first charge-trapping structure comprises a first ferroelectric structure and the second charge-trapping structure comprises a second ferroelectric structure.

7. The integrated circuit memory device of claim 1, wherein the first channel region and the second channel region are disposed within the substrate between source-drain regions.

8. The integrated circuit memory device of claim 1, further comprising:
a connection structure arranged within a dielectric structure over the substrate; and
wherein each of the first charge-trapping device and the second charge-trapping device are disposed over at least a part of the dielectric structure.

9. An integrated circuit memory device, comprising:
a plurality of charge-trapping devices coupled in series; and
a control circuit coupled to a gate connection of each of the plurality of charge-trapping devices, wherein the control circuit is configured to:

store each of one or more inputs of a logic function in a corresponding one of the plurality of charge-trapping devices; and perform, using the plurality of charge-trapping devices, one or more IMPLY operations to execute the logic function, wherein each of the one or more IMPLY operations is performed using a stored value of each of an associated pair of the plurality of charge-trapping devices.

10. The integrated circuit memory device of claim 9, wherein:

for at least one of the one or more IMPLY operations, a drain connection of a first charge-trapping device of the associated pair of the plurality of charge-trapping devices is directly connected to a source connection of a second charge-trapping device of the associated pair of the plurality of charge-trapping devices.

11. The integrated circuit memory device of claim 9, wherein the control circuit is further configured to:

output a result of the logic function from one of the plurality of charge-trapping devices.

12. The integrated circuit memory device of claim 9, wherein:

the logic function is a two-input NAND function;
the plurality of charge-trapping devices comprise a first charge-trapping device, a second charge-trapping device, and a third charge-trapping device; and
storing each of the one or more inputs comprises:
placing each of the first charge-trapping device, the second charge-trapping device, and the third charge-trapping device into a programming state; and
storing a first input of the two-input NAND function in the first charge-trapping device and a second input of the two-input NAND function in the second charge-trapping device while placing the third charge-trapping device in an inhibiting state.

13. The integrated circuit memory device of claim 12, wherein performing the one or more IMPLY operations comprises:

performing a first IMPLY operation using a stored value of the second charge-trapping device and a first stored value of the third charge-trapping device; and
performing a second IMPLY operation using a stored value of the first charge-trapping device and a second stored value of the third charge-trapping device.

14. The integrated circuit memory device of claim 13, wherein performing the first IMPLY operation comprises:

placing the first charge-trapping device in an ON state;
placing the second charge-trapping device in a read state; and
placing the third charge-trapping device in an erasing state.

15. The integrated circuit memory device of claim 13, wherein performing the second IMPLY operation comprises:

placing the first charge-trapping device in a read state;
placing the second charge-trapping device in an ON state; and
placing the third charge-trapping device in an erasing state.

16. The integrated circuit memory device of claim 12, wherein the control circuit is further configured to:

output a result of the two-input NAND function by:
placing the first charge-trapping device in an ON state;
placing the second charge-trapping device in the ON state; and
placing the third charge-trapping device in a read state.

17. A method of performing a logic function in an integrated circuit memory device, the method comprising:

storing each of one or more inputs of the logic function in a corresponding one of a plurality of charge-trapping devices, wherein the plurality of charge-trapping devices are coupled in series;
performing, using the plurality of charge-trapping devices, one or more IMPLY operations to execute the logic function, wherein each of the one or more IMPLY operations is performed using a stored value of each of an associated pair of the plurality of charge-trapping devices; and
outputting a result of the logic function from one of the plurality of charge-trapping devices.

18. The method of claim 17, wherein:

the logic function is an IMPLY function;
the plurality of charge-trapping devices comprises a first charge-trapping device and a second charge-trapping device;
the one or more inputs comprise a first input stored in the first charge-trapping device and a second input stored in the second charge-trapping device;
the one or more IMPLY operations comprise a first IMPLY operation, wherein the first IMPLY operation comprises:
placing the first charge-trapping device in a read state; and
placing the second charge-trapping device in an erasing state; and
outputting the result of the IMPLY function, wherein outputting the result of the IMPLY function comprises:
placing the first charge-trapping device in an ON state; and
placing the second charge-trapping device in the read state.

19. The method of claim 18, wherein:

the second input is a zero logic input such that the result of the IMPLY function is an inverse of the first input.

20. The method of claim 17, wherein:

the logic function is a two-input NAND function;
the plurality of charge-trapping devices comprises a first charge-trapping device, a second charge-trapping device, and a third charge-trapping device;
the one or more inputs comprise a first input stored in the first charge-trapping device and a second input stored in the second charge-trapping device;
the one or more IMPLY operations comprise a first IMPLY operation and a second IMPLY operation;
the first IMPLY operation comprises:
placing the first charge-trapping device in an ON state;
placing the second charge-trapping device in a read state; and
placing the third charge-trapping device in an erasing state;
the second IMPLY operation comprises:
placing the first charge-trapping device in the read state;
placing the second charge-trapping device in the ON state; and
placing the third charge-trapping device in the erasing state; and
outputting the result of the two-input NAND function comprises:
placing the first charge-trapping device in the ON state;
placing the second charge-trapping device in the ON state; and placing the third charge-trapping device in the read state.

* * * * *